US 6,671,855 B1

(12) United States Patent
Hayashi et al.

(10) Patent No.: US 6,671,855 B1
(45) Date of Patent: Dec. 30, 2003

(54) OUTLINE INFORMATION GENERATING APPARATUS AND COMPUTER-READABLE RECORDING MEDIUM RECORDING THEREON OUTLINE INFORMATION GENERATING PROGRAM

(75) Inventors: Koichi Hayashi, Nakai-machi (JP); Takahiko Nomura, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/454,862

(22) Filed: Dec. 7, 1999

(51) Int. Cl.⁷ .............................................. G06F 15/00
(52) U.S. Cl. ..................... 715/530; 345/764; 345/765; 345/766; 345/767; 715/501.1
(58) Field of Search .............................. 715/530, 501.1; 345/764, 765, 766, 767

(56) References Cited

U.S. PATENT DOCUMENTS

| | | | |
|---|---|---|---|
| 5,072,412 A | * 12/1991 | Henderson et al. | 345/804 |
| 5,159,669 A | * 10/1992 | Trigg et al. | 345/814 |
| 5,233,687 A | * 8/1993 | Henderson et al. | 345/804 |
| 5,394,521 A | * 2/1995 | Henderson et al. | 345/804 |
| 5,553,282 A | * 9/1996 | Parrish et al. | 707/10 |
| 5,659,735 A | * 8/1997 | Parrish et al. | 707/10 |
| 5,752,245 A | * 5/1998 | Parrish et al. | 707/10 |
| 6,151,606 A | * 11/2000 | Mendez | 707/201 |
| 6,381,502 B1 | * 4/2002 | Rudder et al. | 700/2 |

FOREIGN PATENT DOCUMENTS

| | | |
|---|---|---|
| JP | A-9-330360 | 12/1997 |
| JP | A-10-31660 | 2/1998 |

OTHER PUBLICATIONS

Henderson at et., "Rooms: The Use of Multiple Virtual Workspace to Reduce Space Contention in a Window—Based Graphical User Interface, " ACM Transactions on Graphics, vol. 5, No. 3,Jul. 1986, pp. 211–243.*

R. Bentley et al., *Basic Support For Cooperative Work On The World Wide Web*, International Journal of Human Computer Studies: Special Issue on Novel Applications of the WWW, pp. 1–13, 1997.

* cited by examiner

Primary Examiner—Joseph H. Feild
Assistant Examiner—Maikhanh Nguyen
(74) Attorney, Agent, or Firm—Oliff & Berridge, PLC

(57) ABSTRACT

A document outlining any work done on a workspace is to be automatically generated. A workspace history managing part holds the present and past states of a workspace together with history information on the manipulation performed on the workspace. A synthesis rule holding part holds synthesis rules for synthesizing information. A synthesizing part, working on history information managed by the workspace history managing part, synthesizes information in accordance with the synthesis rules held by the synthesis rule holding part, and thereby generates outline information. This dispenses with the need for a user to prepare documents stating the progress of his or her work, and reduces the user's workload correspondingly. Moreover, automatic generation of outline information makes the latest information available all the time.

15 Claims, 30 Drawing Sheets

FIG. 4

DATA STRUCTURE OF WORKSPACE MANAGING UNIT

| workspace ID | workspace name | snapshots Ids | derives | workspace URL |
|---|---|---|---|---|
| 001 | GUI Patent | A001, A002, A003 | 002 | http://fx.co.jp/ws/GUI PATENT |
| 002 | Dialog Patent | B001, B002, B003 | | http://fx.co.jp/ws/DIALOG PATENT |
| 003 | Proto Spec | C001, C002, C003, C004 | | http://fx.co.jp/ws/PROTOCOL SPECIFICATIONS |

FIG. 5

DATA STRUCTURE OF WORKSPACE

| Attribute | value |
|---|---|
| snapshot ID | C001 |
| anchor IDs | C001/REQUEST FORM, C001/DB DESIGN |
| snapshot URL | http://fx.co.jp/snapshots/MAY 20-GUI PATENT |
| creation date | 0520 |
| regions | ("ISSUED", (10, 20, 400, 500)) |
| index | |
| state | "START" |
| comments | PROCEED AS THE REQUEST FORM REQUIRES |

FIG. 6

DATA STRUCTURE OF ANCHOR

| Attribute | value |
|---|---|
| anchor ID | B002/GUI DESIGN |
| anchor name | "DIALOG PATENT/GUI DESIGN" |
| document URL | http://fx.co.jp/documents/GUI DESIGN |
| creation date | 0604 |
| edit count | 1 |
| size | NORMAL |
| position | 200, 100 |
| approved | Hayashi |
| comments | MAKE THE MESSAGE SIMPLER |

FIG. 7
DATA STRUCTURE OF OPERATION HISTORY

| snapshot ID | operation NO | executed operation |
|---|---|---|
| A001 | 1 | create-ws "GUI PATENT" |
| A001 | 2 | create-doc "GUI PATENT" |
| A001 | 3 | edit "GUI DESIGN" |
| A002 | 1 | create-doc "PATENT SPECIFICATION" |
| A002 | 2 | edit "PATENT SPECIFICATION" |
| A002 | 3 | copy "VARIOUS FORMS/APPLICATION REQUEST FORM" "GUI PATENT" |
| A002 | 4 | edit "APPLICATION REQUEST FORM" |
| A003 | 1 | remove "GUI DESIGN" |
| A003 | 2 | print "PATENT SPECIFICATION" |
| B001 | 1 | derive-ws "DIALOG PATENT" |
| B001 | 2 | edit "PATENT SPECIFICATION" |
| B002 | 1 | edit "PATENT SPECIFICATION" |
| B002 | 2 | rename "GUI DESIGN" "DIALOG DESIGN" |
| B002 | 3 | edit "DIALOG DESIGN" |
| B002 | 4 | prop-doc "DIALOG DESIGN" |
| B003 | 1 | edit "PATENT SPECIFICATION" |
| B003 | 2 | print "PATENT SPECIFICATION" |
| B003 | 3 | move "DIALOG PATENT/DIALOG DESIGN" "PROTOCOL SPECIFICATIONS" |
| C001 | 1 | create-ws "PROTOCOL SPECIFICATIONS" |
| C001 | 2 | prop-ws "PROTOCOL SPECIFICATIONS" |
| C001 | 3 | create-doc "REQUEST FORM" |
| C001 | 4 | edit "REQUEST FORM" |
| C001 | 5 | create-doc "DB DESIGN" |
| C001 | 6 | edit "DB DESIGN" |
| C001 | 7 | set-region "ISSUED" 10 20 400 500 |
| C002 | 1 | create-doc "ANALYSIS" |
| C002 | 2 | edit "ANALYSIS" |
| C002 | 3 | drag-doc "DB DESIGN" 200 100 |
| C003 | 1 | remove "REQUEST FORM" "ANALYSIS" |
| C003 | 2 | prop-ws "PROTOCOL SPECIFICATIONS" |
| C004 | 1 | move "DIALOG PATENT/DIALOG DESIGN" "PROTOCOL SPECIFICATIONS" |
| C004 | 2 | edit "DIALOG DESIGN" |

FIG. 8
DATA STRUCTURE OF SYNTHESIS RULE

| category | attribute | value |
|---|---|---|
| generic | rule name | WS PATENT OUTLINE |
| generic | rule URL | http://fx.co.jp/documents/ WS PATENT OUTLINE |
| generic | workspace | "GUI PATENT", "DIALOG PATENT", "PROTOCOL SPECIFICATIONS" |
| generic | derive | 0 |
| generic | influence | 0 |
| generic | update interval | 4 |
| generic | what's new interval | 1 |
| hot links | region | "ISSUED" |
| hot links | long life | 1 |
| hot links | large size | ON |
| hot links | state | (approved, "Hayashi") |
| hot links | comments | ON |
| hot links | frequency | 3 |
| hot links | print | ON |
| history | operation print | ON |
| history | operation send mail | OFF |
| history | index | ON |
| history | comments | ON |
| history | state | ON |
| history | break point | 7 |
| history | revive | 7 |
| history | clean up | 1 |
| history | document appeared | "REQUEST FORM" |
| history | document removed | "REQUEST FORM" |
| related activity | derive | ON |
| related activity | influence | ON |
| what's new | links add/revised | ON |
| what's new | links remove | ON |
| what's new | operation print | ON |
| what's new | operation send mail | OFF |
| what's new | relation derive | OFF |
| what's new | relation influence | OFF |

OUTLINE INFORMATION GENERATING APPARATUS AND COMPUTER-READABLE RECORDING MEDIUM RECORDING THEREON OUTLINE INFORMATION GENERATING PROGRAM

BACKGROUND OF THE INVENTION

1. Field of the Invention

The present invention relates to an outline information generating apparatus for generating outline information obtained from a group of information items and a computer-readable recording medium recording thereon an outline information generating program, and more particularly to an outline information generating apparatus for generating outline information on the outline of activities performed on workspaces in an environment for manipulating electronic resources and a computer-readable recording medium recording thereon an outline information generating program.

2. Description of the Related Art

The advancement of network technology has enabled persons separated by a spatial distance, an organizational barrier or a time differential to work together. As a tool for the exchange of information between such separated co-workers, e-mails are extensively used. Especially the capability of the e-mail system to simultaneously send the same message to more than one recipient is a useful feature for maintaining communication with plural counterparts. However, there remains the problem that in exchanging e-mails in an actual situation of co-working, it is difficult to inform one another of the progress of the respective co-workers' jobs. It takes much trouble to write an e-mail in such a manner that the progress of one's job, which the partners would spontaneously know if working physically together, can be accurately communicated to those spatially distant from the sender. Furthermore, for the recipient to understand the stage of progress at which the e-mail was written, he or she has to remember the contents of the e-mails exchanged in the past in addition to the background of the currently received e-mail. The greater the number of co-workers becomes, the greater the number of e-mails to be received increases, and accordingly the greater the labor to respond adequately is required.

As an arrangement to support joint work, a workflow system is known. The workflow system, as its processing is based on the definition of the flow of work, is difficult to apply to a work procedure of which the flow is prevented from clear definition by many exceptions involved or any other similar reason, and can hardly uniformly support workers performing a variety of miscellaneous tasks in parallel.

In view of these problems, the following two methods are conceived to keep track of activities by persons in spatially distant locations.

By a first method using working environments known as workspaces, co-workers can notify one another of the progress of their respective tasks without having to take extra trouble for the exchange of information. A workspace is an environment for supporting smooth progress of the performance of a given project by collectively maintaining and managing resources required for it. Co-workers are enabled to know how one another's task is progressing by watching state changes in a shared workspace and/or one another's individual workspace. A Basic Support for Cooperative Work (BSCW) system now under study by GMD (National Research Center for Information Technology in Germany) allows each co-worker to know what some other co-workers did while he or she was unaware by presenting the records of operations in a shared working environment. Also, a workspace technique disclosed in the Japanese Published Unexamined Patent Application No. Hei 10-31660 enables a co-worker to understand any work accomplished in a given workspace by recording and managing in a time series the history of its states and changes in it.

A second method is to enable a person to keep track of the activities of another person at a distance organizationally or physically by publishing them on a World Wide Web (WWW) page. While WWW is a technique having developed in an externally open Internet environment, it can as well be effectively utilized in a corporate or other closed network environment. By having each participating person or department publish the current state of its activities on a WWW page, the progress of the activities can be known among the participants without having to send a large number of e-mails to others as in a conventional e-mail system.

The WWW pages are written in a document description language known as Hyper Text Markup Language (HTML). Initially the discloser of information had to write a WWW page directly in this language, which made WWW page writing an extremely complex task. To eliminate this complexity, HTML editors including Adobe's PageMill (trademark of Adobe Systems, U.S.) and Microsoft's FrontPage (trademark of Microsoft Corporation, U.S.) were developed, which automatically generate HTML by editing operation like word processing. Use of an HTML editor simplifies WWW page preparation and editing, and can thereby reduce time taken to update the contents along with the progress of work.

Methods of the prior art, however, involve the following problems.

The problem with the first method described above is that, though it can be useful for co-workers having some knowledge of one another's task, it does not allow mutual understanding among organizationally distant co-workers. Thus, sharing of a state on a workspace is like knowing the state of work progress from the state on the desk of the co-workers physically around. Therefore, a co-worker already knowing the background of the partners' work may be able to know what and how the others are doing if they are spatially close to him or her, but not the jobs of organizationally or physically distant co-workers. For instance, if someone is developing software application, his or her colleague, a software engineer, can know the progress of the development by looking into a shared workspace. However, a marketing specialist, even if he or she looks into the shared workspace to find out when the product will become available for shipment, will find it impossible to know anything about the progress of the development unless the marketing person understands the programming language or the procedure of program development.

The problem with the second of the methods cited above is that, as a WWW page is manually prepared, timely updating of the page is not necessarily possible. The updating consumes much labor because it involves the task of arranging and putting information on the progress of activities readily understandable for everyone concerned. Moreover, since it is an auxiliary process to the regular activities of the person who updates the page, its priority lessens as the updating person becomes busier in his or her regular activities, with the consequence that sufficient information for joint work often is not made available to the co-workers.

Although the development of the HTML editors has facilitated the preparation of WWW pages, the WWW pages cannot serve the purpose if they are not updated after its creation. Timely updating of the page is required so that it can always reflect the latest state of activities. Inventions intended to reduce the trouble of updating a WWW page along with changes in activities include, for instance, an electronic mall system disclosed in the Japanese Published Unexamined Patent Application No. Hei 9-330360. According to this invention, if a client keeping an electronic shop in the form of a WWW page on an electronic mall enters in advance its current state into a predetermined document, a WWW page reflecting its contents will be automatically generated. This enables the user to concentrate on its main activities, managing the electronic shop in this case, without worrying about WWW page updating, which is required outside the main activities. However, this method is applicable only where the range of information to be disclosed on the WWW page can be predetermined.

As noted above, according to the prior art, whether by using an e-mail or by opening a WWW page, a labor consuming task is required to make the state of activities known among co-workers. Moreover, since it is an auxiliary process to the regular activities of the person who updates the page, its priority lessens as the updating person becomes busier in his or her regular activities, with the consequence that sufficient information for joint work often is not made available to the co-workers. On the other hand, while it is possible to facilitate sharing of knowledge on the state of work progress by using workspaces, this advantage is available only to closely cooperating partners. Automatic updating of a WWW page by preparing a document into which only such information as needs to be published is entered can be applied merely to tasks for which the items to be published can be determined in advance.

SUMMARY OF THE INVENTION

In view of the problems noted above, the present invention provides an outline information generating apparatus capable of automatically generating a document outlining any work that has been done on a workspace.

The present invention also provides a computer-readable recording medium recording thereon an outline information generating program for causing a computer to automatically generate a document outlining any work that has been done on a workspace.

In order to solve the problems described above, according to the present invention, the outline information generating apparatus has a workspace editing part for altering the most latest state of a workspace by manipulating the electronic resources on the workspace as instructed by a user, a workspace history managing part for holding as history information the contents and objects of manipulation performed by the workspace editing part on the workspace, a synthesis rule holding part for holding synthesis rules prescribing rules on the synthesis of history information, and a synthesizing part for synthesizing, in accordance with the synthesis rules held by the synthesis rule holding part, the history information managed by the workspace history managing part and generating outline information.

Such an outline information generating apparatus stores in advance synthesis rules fitting the intended purpose in the synthesis rule holding part, and synthesizes with the synthesizing part required information by processing history information held by the workspace history managing part in accordance with the synthesis rules, resulting in the generation of outline information.

Further in order to solve others of the problems described above, the present invention provides a computer-readable recording medium recording thereon an outline information generating program for generating information on the outline of activities performed on a workspace, which is an environment for manipulating electronic resources. The program causes the computer to function as a workspace editing part for altering the latest state of a workspace by manipulating the electronic resources on the workspace as instructed by a user, a workspace history managing part for holding as history information the contents and objects of manipulation performed by the workspace editing part on the workspace, a synthesis rule holding part for holding synthesis rules prescribing rules on the synthesis of history information, and a synthesizing part for synthesizing, in accordance with the synthesis rules held by the synthesis rule holding part, the history information managed by the workspace history managing part and generating outline information.

By causing a computer to execute an outline information generating program recorded on such a recording medium, necessary functions for the above-described outline information generating apparatus are built up on the computer.

BRIEF DESCRIPTION OF THE DRAWINGS

A preferred embodiment according to the present invention will be described in detail based on the drawings:

FIG. 4 is a table showing the data structure of the workspace managing unit;

FIG. 5 is a table showing the data structure for expressing the state of a workspace;

FIG. 6 is a table showing the data structure of an anchor;

FIG. 7 is a table showing a structure for recording the history of operation performed on a workspace;

FIG. 8 is a table showing the data structure of synthesis rules;

DETAILED DESCRIPTION OF THE PREFERRED EMBODIMENT

Figure 1:
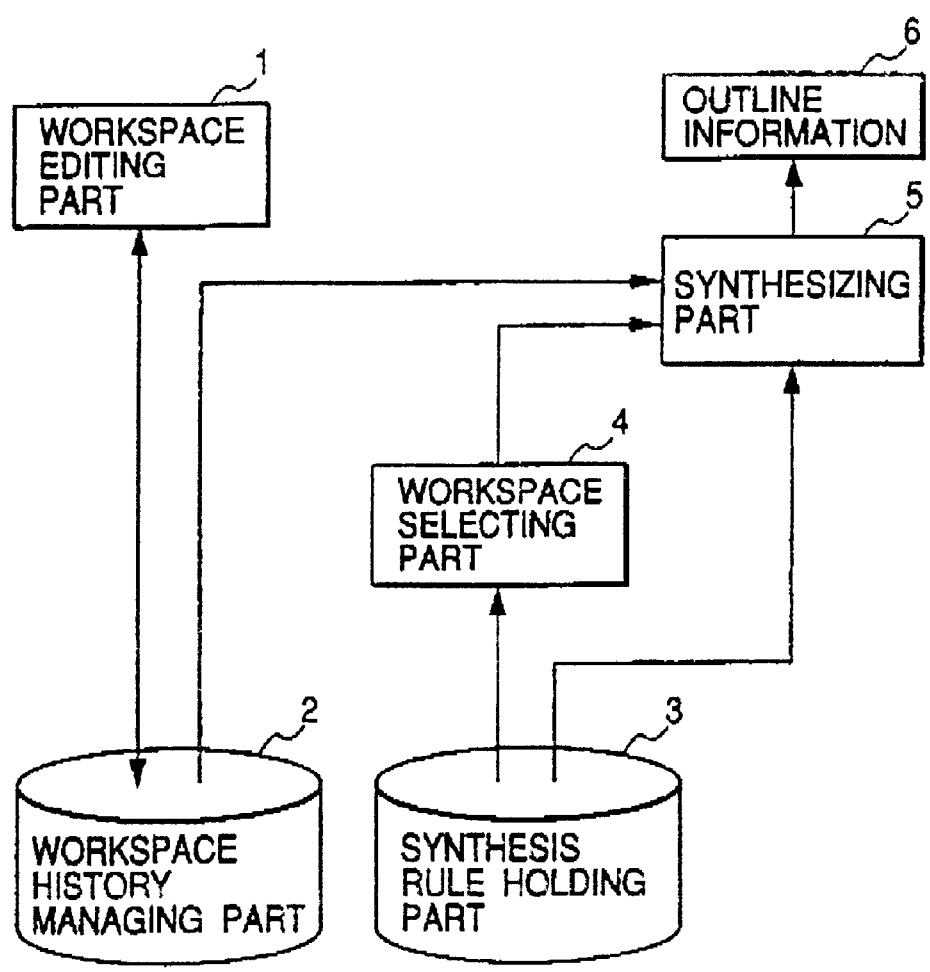
FIG. 1 illustrates a configuration based on a principle of the present invention.

FIG. 1 illustrates the configuration based on the principle of the present invention. An outline information generating apparatus according to the present invention has the following elements.

A workspace editing part 1, as instructed by a user, manipulates electronic resources on a workspace, and alters the latest state of the workspace. A workspace history managing part 2 holds the present and past states of the workspace together with history information on the manipulations performed on the workspace. A synthesis rule holding part 3 holds synthesis rules for synthesizing information. A workspace selecting part 4 selects, in accordance with the synthesis rules held by the synthesis rule holding part 3, one or more workspaces out of the workspaces held by the workspace history managing part 2. A synthesizing part 5 synthesizes items of information related to the workspace(s) selected by workspace selecting part 4, out of the items of information managed by the workspace history managing part 2, in accordance with the synthesis rules held by the synthesis rule holding part 3, and thereby generates outline information 6.

In such an outline information generating apparatus, synthesis rules fitting the intended purpose are stored in advance in the synthesis rule holding part 3. Then, the workspace selecting part 4 selects in accordance with the synthesis rules the workspace(s) to be processed. The synthesizing part 5 then synthesizes in accordance with the synthesis rules the items of information on the selected workspace(s). As a result, outline information 6 is generated. Therefore, the user no longer needs to prepare documents describing the progress of his or her work with a corresponding alleviation of his or her workload. Since, moreover, the outline information 6 is automatically generated, the latest information can be obtained all the time.

The embodiment of the present invention applied to a system in which workspaces are shared via a network will be described more specifically.

Figure 2:
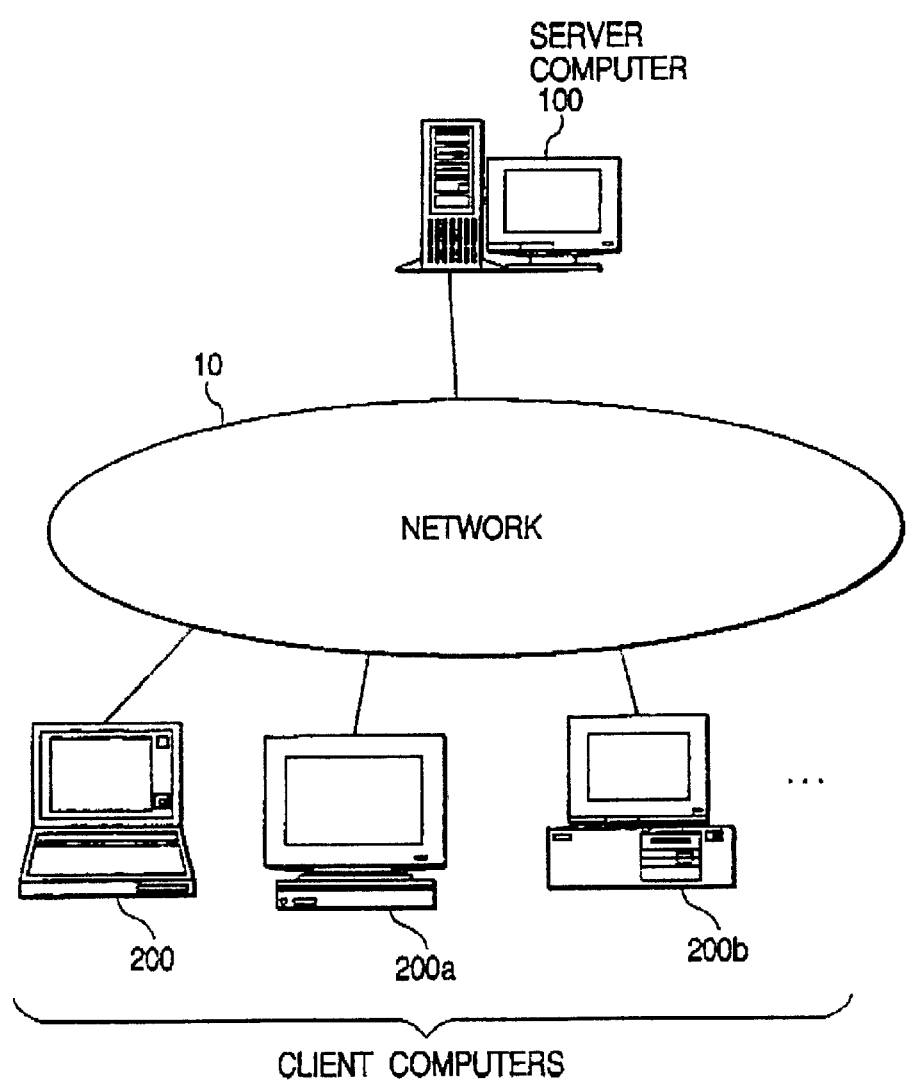
FIG. 2 illustrates a system configuration for implementing the present invention.

FIG. 2 illustrates a system configuration for implementing the present invention. in the system of this embodiment, a server computer 100 and plural client computers 200, 200a and 200b are connected to each other via a network 10.

Figure 3:
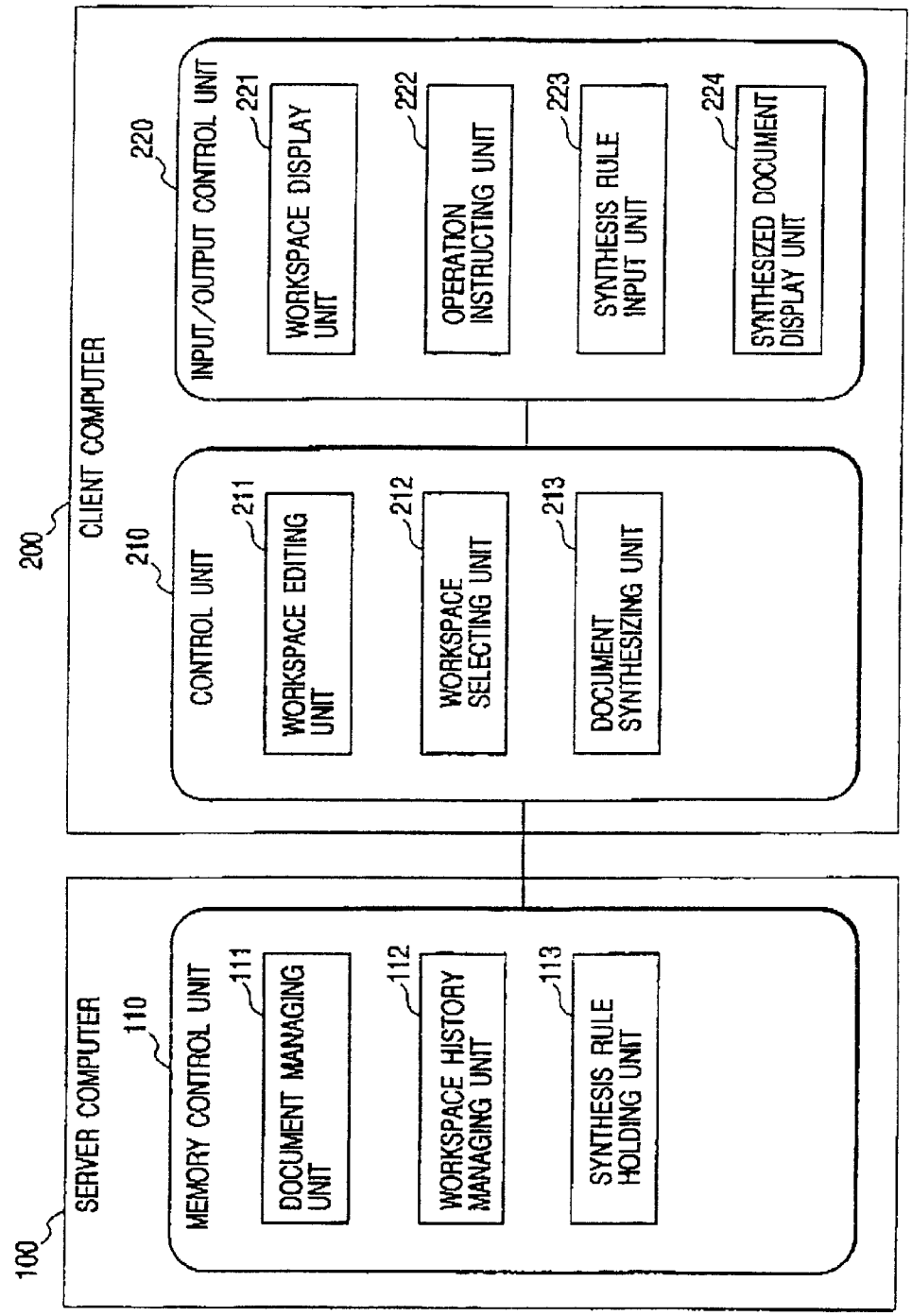
FIG. 3 illustrates internal configurations of constituent apparatuses.

FIG. 3 illustrates the internal configurations of constituent apparatuses. The server computer 100 is provided with a memory control unit 110 taking charge of recording and storing data. On the other hand, a client computer 200 is provided with a control unit 210 for executing a program to carry out principal steps of processing of this system and an input/output control unit 220 to take charge of interactions with the user. Though this embodiment uses a configuration wherein the memory control unit 110 is provided within the server computer 100 and the control unit 210 and the input/output control unit 220 are arranged within the client computers 200, these units being connected by the network 10, various other configurations are conceivable. For example, the control unit, too, may be arranged on the server side by using applet or a similar technique, or all the units may as well be structured in a single computer without having a network in-between. Alternatively, the individual control units may be further dispersed on the network.

The processing functions of the individual components will be described below.

The memory control unit 110 records information concerning documents, workspace history, synthesis rules and the like necessary for the implementation of the present invention, and manages the recorded information. The substance of the data is recorded in a secondary storage apparatus such as a hard disk apparatus. In the memory control unit 110 in this embodiment, any item of the managed information can be accessed by a network protocol. The memory control unit 110 has a document managing unit 111, a workspace history managing unit 112, and a synthesis rules holding unit 113.

The document managing unit 111 manages documents prepared by using a word processor or an HTML editor. In this embodiment, a WWW server in common use is utilized.

The workspace history managing unit 112 manages information concerning the history of workspace updating. The history of workspaces is stored in a prescribed form into a database managed by the workspace history managing unit 112. Each workspace matches the user a working environment including the history. A workspace references a set of documents as an electronic resource. The unit for referencing documents is called an anchor. Anchors are arranged on a plane defined by a workspace, and references a document in the document managing unit 111 using a uniform resource locator (URL).

FIG. 4 is a table showing the data structure of the workspace managing unit. In the table, "workspace ID"

denotes the identifier of the workspace; "workspace name", the name of the workspace; "snapshot IDs", the identifier of a state (snapshot) included in the workspace; "derives", the identifier of a workspace derived from the workspace, and "workspace URL", a URL for referencing the workspace. Using the URL shown here, the user can call this workspace.

FIG. 5 is a table showing the data structure for expressing the state of the workspace. Data of such a structure is provided in each state (snapshot) of the workspace. In the table, "snapshot ID" denotes the identifier of a state (snapshot) of the workspace: "anchor Ids", the identifier of an anchor included in the state of the workspace: "snapshot URL", a URL for referencing the state of the workspace; "creation date", the day on which the state of the workspace was recorded; and "regions", the name and extent of the region (region) defined in the state of the workspace. Using the URL shown here, the user can call this state of the workspace. Further in the table, "index" denotes an index to be assigned as the key to selection of this state of the workspace; "state", a state in the process of work represented by the workspace, the state being "start", "reviewed" or "end" here, and "comments", a field holding any memo entered by the user.

FIG. 6 is a table showing the data structure of an anchor. In the table, "anchor ID" is the identifier of the anchor; "anchor name" denotes the name of the anchor; "document URL", the URL of a document the anchor is referencing, which is taken out as a link for referencing documents when a document is synthesized; "creation date", the day on which the anchor was created; "edit count", the number of times the editing of the document has been executed; "size", the size of the anchor on the workspace, which takes here a value of "SMALL", "NORMAL" or "LARGE"; "position", the position of the anchor on the workspace; "approved", an attribute indicating approval, and "comments", a field holding any memo entered by the user.

FIG. 7 is a table showing a structure for recording the history of operations performed on a workspace. In the table, "snapshot ID" is the identifier of a state (snapshot) of the workspace; "operation NO", an identifying number assigned to an operation executed in the corresponding state of the workspace, and "Executed operation" denotes the contents of the executed operation.

The synthesis rules holding unit 113 holds rules for controlling the mechanism of document synthesis.

FIG. 8 is a table showing the data structure of the synthesis rules. The rules includes a list of attributes (attribute) divided into five categories: "generic attributes (generic)", "hot links (hot links)", "history (history)", "related activity (related activity)" and "latest state (what's new)". The category "generic" includes attributes applicable to all the data to be synthesized; "hot links", a rule for generating a set of links of important documents for indicating the outline on the workspace; "history", a rule for generating a set of links to states of the workspace in which important events took place; "related activity", a rule for generating a set of links to workspaces related to a designated workspace, and "what's new", a rule for generating a set of links to documents on events having taken place, workspace states and workspaces in a prescribed period of time.

In this example, relationships of derivation (derive) and influencing (influence) are used for determining related workspaces. A relationship of derivation arises when a new workspace is generated, branching out of a specific state of an existing workspace. The relationship between the workspace which is the origin of branching and a workspace into which the branching has taken place is called a relationship of derivation. A relationship of influencing arises when an anchor for referencing a document is copied or moved from one workspace to another and the states of the workspaces have changed as a result. The relationship between the workspace in which the copied or moved anchor had existed and the workspace coming to have that anchor after the copying or movement is called a relationship of influencing.

The meaning of each synthesis rule is explained below. In the following explanation, each rule will be denoted by a "category/attribute". Some of the synthesis rules define information, such as the name of a synthesized document, while others prescribe conditions regarding an anchor and the like to be included in a synthesized document (extracted rules).

(1) Category "Generic"

Attributes belonging to the category generics are various set items applicable to all the synthesis rules.

An attribute "generic/rule name" indicates the name of a document synthesis rule. A document generated by document synthesis is assigned a name designated by "rule name".

An attribute "generic/rule URL" is the URL of a document synthesis rule. It is used as the address of a document when the document is synthesized. A default storage destination can be prescribed, and where "rule URL" is omitted, the document is stored into the default storage destination in a file name designated by "rule name".

An attribute "generic/workspace" is the name of the workspace searched for information. Documents in the workspace designated by this attribute are to be synthesized.

An attribute "generic/derive" indicates whether or not a workspace in a relationship of derivation is in the range of search. If the value is "0", the workspace in a relationship of derivation is not included in the range of search or, if the value is "1", it is included in the range of search.

An attribute "generic/influence" indicates whether or not a workspace in a relationship of influencing is in the range of search. If the value is "0", the workspace in a relationship of influencing is not included in the range of search or, if the value is "1", it is included in the range of search.

An attribute "generic/update interval" is the updating period when a synthesized document is to be periodically renewed to the latest state. For this attribute, a value indicating the number of days is set.

An attribute "generic/what's new interval" indicates a period to be referenced in extracting progress information. For this attribute, a value indicating the number of days is set. When, for instance, a recently updated document is to be linked, this attribute prescribes how many days is meant by "recently".

(2) Category "Hot Links"

Rules belonging to the category "hot links" are rules governing the selection of documents satisfying prescribed conditions out of the documents a designated workspace is or was holding or referencing, and the synthesis of a hyperdocument containing links referencing those documents.

An attribute "hot links/region" is a synthesis rule for designating a specific region (region) when a document in that region is to be linked to. If the value of this attribute (value) is a string of characters not null, the string of characters set as the name of the region and an anchor satisfying the following conditions are retrieved from the workspace which is the object of search, and a link to the document referenced by the detected anchor is outputted:

Out of anchors having the same name (anchor name) it is one in the last workspace state (snapshot).

Its position (position) is in the region whose name is identical with the string of characters set as the value (value).

An attribute "hot links/long life", is a synthesis rule for linking to a document used for a long period. This synthesis rule is provided because a document used for a long period is likely to be an important one. When its value (value) is an integer greater than 0, an anchor satisfying the following conditions is retrieved from the workspace which is the object of search, and a link to the document referenced by the detected anchor is outputted:

Out of anchors having the same name (anchor name), it is one in the last workspace state (snapshot).

The result of subtraction of the creation date (creation date) from the current date is greater than what is set as the value (value).

An attribute "hot links/large size" is a synthesis rule for linking to a document having a large icon size. This synthesis rule is provided because a document having a large icon size is likely to have relatively important contents. Incidentally, icons of three different sizes (LARGE, NORMAL and SMALL) can be used. When its value (value) is ON, an anchor satisfying the following conditions is retrieved from the workspace which is the object of search, and a link to the document referenced by the detected anchor is outputted;

Out of anchors having the same name (anchor name), it is one in the last workspace state (snapshot).

The size (size) is LARGE.

An attribute "hot links/state" is a synthesis rule for linking to a document having the value of a state prescribed by the process of work. If the value (value) of this attribute is two strings of characters not null, a link to the document referenced by an anchor satisfying the following conditions is outputted:

Out of anchors having the same name (anchor name), it is one in the last workspace state (snapshot).

A second string of characters is set for the attribute indicated by a first string of characters of the value (value).

Figure 9:
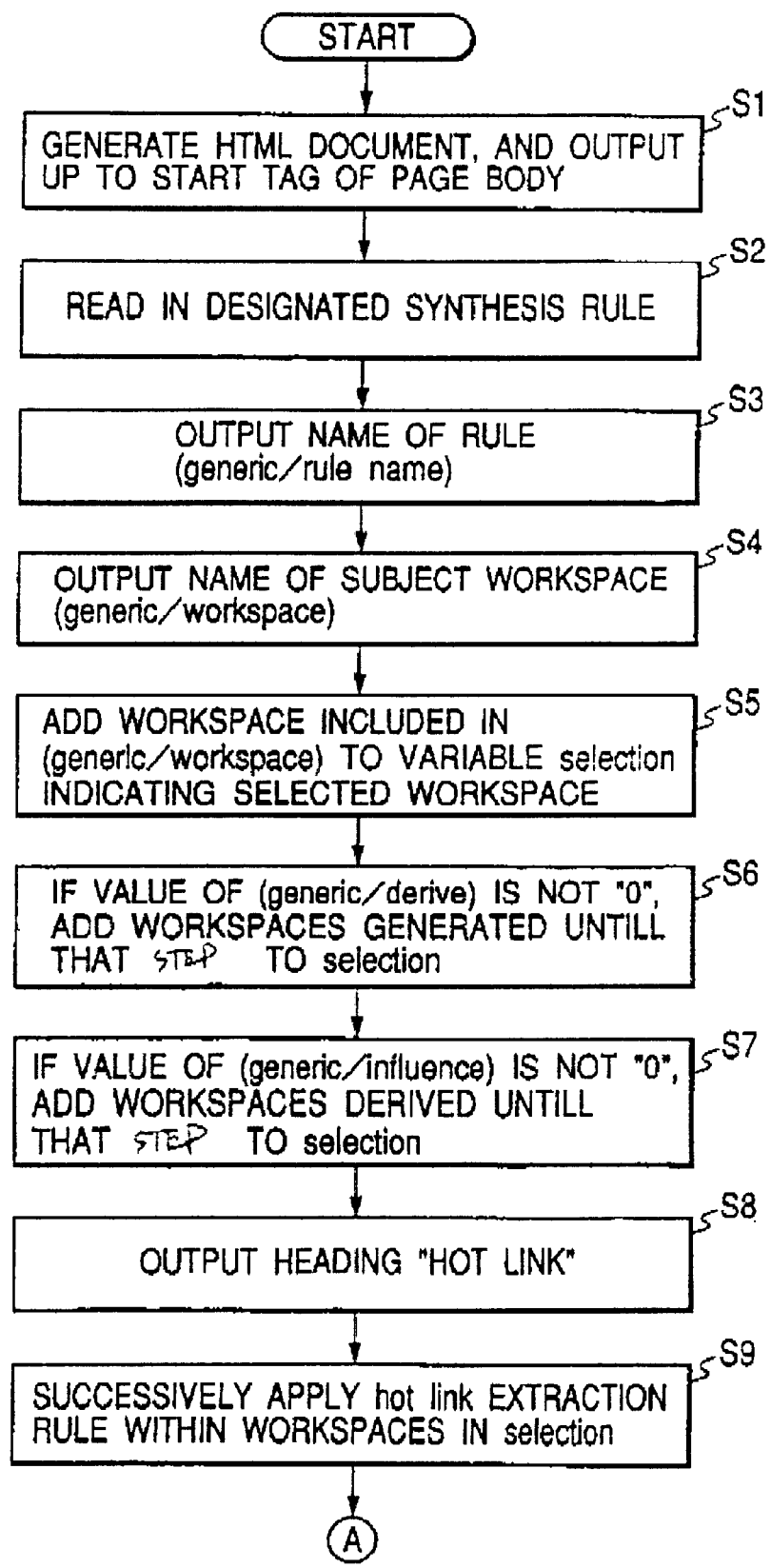
FIG. 9 is the first half of a flowchart showing the procedure of processing workspace selection and synthesis.

By using this synthesis rule, a link to a document satisfying a specific requirement can be established. In the example of FIG. 9, since (approved, "Hayashi") is set, a link is established to a document approved by a user named "Hayashi".

An attribute "hot links/comments" is a synthesis rule for linking to a document to which comments are added. When its value (value) is ON, a link to a document referenced by an anchor satisfying the following conditions is outputted, associating the link with the contents of the comments:

Out of anchors having the same name (anchor name) it is one in the last workspace state (snapshot).

A string of characters not null is set as the comments (comments).

An attribute "hot links/frequency" is a synthesis rule for linking to a document edited many times. This synthesis rule is provided because a document edited many times is likely to be a correspondingly more important document. When its value (value) is an integer greater than 0, a link to a document referenced by an anchor satisfying the following conditions is outputted:

Out of anchors having the same name (anchor name), it is one in the last workspace state (snapshot).

The number of times of editing (edit count) is no smaller than what is set as the value (value).

An attribute "hot links/print" is a synthesis rule for linking to a printed document. This synthesis rule is provided because a document that is printed is likely to be a relatively important document. When its value (value) is ON, a link to a document referenced by an anchor satisfying the following conditions is outputted:

It is the argument of printing operation (print) in the history of operations.

(3) Category "History"

Synthesis rules belonging to the category "history" are synthesis rules for selecting states satisfying prescribed conditions out of the present and past states of a designated workspace and generating links to reference those states.

An attribute "history/operation print" is a synthesis rule for linking the state in which printing was accomplished. When its value (value) is ON, a link referencing a state of the workspace satisfying the following conditions is outputted. associating the link with the operation name (print) and the anchor name of its argument:

The history of operations contains a printing operation (print).

An attribute "history/operation send mail" is a synthesis rule for linking the state in which a mail was sent. When its value is ON, a link referencing a state of the workspace satisfying the following conditions is outputted, associating the link with the operation name (send mail) and the anchor name of its argument:

The history of operations contains a mail transmitting operation (send mail).

An attribute "history/index" is a synthesis rule for linking the state in which an index is given. When its value (value) is ON, a link referencing a state of the workspace satisfying the following conditions is outputted, associating the link with a string of characters set as the index name (index):

A string of characters not null is set as the index name (index).

An attribute "history/comments" is a synthesis rule for linking the state in which any comment is given. When its value (value) is ON, a link referencing a state of the workspace satisfying the following conditions is outputted, associating the link with a string of characters set as the contents of the comment(s) (comments):

A string of characters not null is set as the contents of the comment(s) (comments).

An attribute "history/state" is a synthesis rule for linking the state having the value of a state prescribed by the process of work, when its value (value) is ON, a link referencing a state of the workspace satisfying the following conditions is outputted, associating the link with a string of characters set as the state (states):

A predetermined string of characters not null is set as the state (states).

An attribute "history/breakpoint" is a synthesis rule for linking the final state of a suspended workspace. When its value (value) is an integer greater than 0, a link referencing a state of the workspace satisfying the following conditions is outputted:

After that state of the workspace, there is a period longer than the number of days indicated by what is set as the value (value) during which no new operation was recorded.

An attribute "history/revive" is a synthesis rule for linking the initial state of a revived workspace. When its value (value) is an integer greater than 0, a link referencing a state of the workspace satisfying the following conditions in outputted:

Before that state of the workspace, there is a period longer than the number of days indicated by what is set as the value (value) during which no new operation was recorded.

An attribute "history/clean up" is a synthesis rule for linking a state in which many anchors were collectively removed. When its value (value) is an integer greater than 0, a link referencing a state of the workspace satisfying the following conditions is outputted:

The operation by which a greater number of anchors than what is set as the value (value) were removed (remove) is included in the history of operations.

An attribute "history/document appeared" is a synthesis rule for linking a state in which a specific document has appeared. When its value (value) is a string of characters not null, a link referencing a state of the workspace satisfying the following conditions is outputted:

An anchor whose name is identical with the string of characters of the value (value) appeared.

An attribute "history/document removed" is a synthesis rule for linking a state in which a specific document has been removed. When its value (value) is not null, a link referencing a state of the workspace satisfying the following conditions is outputted:

An anchor whose name is identical with the string of characters of the value (value) was removed.

(4) Category "Related Activity"

Synthesis rules belonging to the category "related activity" are synthesis rules for selecting a workspace(s) having a prescribed relationship with a designated workspace out of the workspace history managing unit 112 and synthesizing a document indicating the contents thereof.

An attribute "related activity/derive" is a synthesis rule for linking a derived workspace. When its value (value) is ON, a link referencing a workspace satisfying the following conditions is outputted:

There is a relationship of derivation (derive).

An attribute "related activity/influence" outputs a link referencing a workspace satisfying the following conditions when the value (value) linking a workspace which is the destination of a copied document is ON.

There is a relationship of influencing (influence), i.e. the workspace is the argument of a copy or move operation in the history of operations.

(5) Category "What's New"

Synthesis rules belonging to the category of "what's new" are synthesis rules for synthesizing a document whose contents include expressions of an increase or decrease of electronic resources in a designated workspace within a designated period, attributes of electronic resources, operations on electronic resources, and changes in relationship among workspaces.

An attribute "what's new/'links add/revised'" is a synthesis rule for linking a document added or revised within a prescribed period. When its value (value) is ON, a link referencing an anchor satisfying the following conditions in a state within a prescribed period from the current moment (generic/what's new interval) is outputted:

The anchor was added or revised by a copy, move, create or edit operation in the history of operations.

An attribute "what's new/links removed" is a synthesis rule for linking a document removed within a prescribed period. When its value (value) is ON, a link referencing an anchor satisfying the following conditions in a state within a prescribed period from the current moment (generic/what's new interval) is outputted:

The anchor was removed by a remove or move operation in the history of operations.

An attribute "what's new/operation print" is a synthesis rule for linking a state in which printing was done with a prescribed period. When its value (value) is ON, a link referencing a state satisfying the following conditions in a state within a prescribed period from the current moment (generic/what's new interval) is outputted:

A printing operation (print) is included in the history of operations.

An attribute "what's new/operation send mail" is a synthesis rule for linking a state in which an electronic mail was sent within a prescribed period. When its value (value) is ON, a link referencing a state satisfying the following conditions in a state within a prescribed period from the current moment (generic/what's new interval) is outputted:

An electronic mail sending operation (send mail) is included in the history of operations.

An attribute "what's new/relation derived" is a synthesis rule for linking a workspace which has derived within a prescribed period. When its value (value) is ON, a link referencing a workspace satisfying the following conditions within a prescribed period from the current moment (generic/what's new interval) is outputted:

It is an argument of a derived operation (derive-ws) in the history of operations.

An attribute "what's new/relation influenced" is a synthesis rule for linking a workspace which has become a destination of document copying within a prescribed period. When its value (value) is ON, a link referencing a workspace satisfying the following conditions within a prescribed period from the current moment (generic/what's new interval) is outputted:

It has a relationship of influencing (influence), i.e. is an argument of a copy or move operation in the history of operations.

The memory control unit 110 has been described so far. Referring back to FIG. 3, the functions of the control unit 210 will be described below.

The control unit 210 is a part executing a program required for carrying out operations which the present invention requires. More specifically, it is implemented by the execution of a prescribed program by the CPU of the client computer 200. The control unit 210 is provided with a workspace editing unit 211, a workspace selecting unit 212, and a document synthesizing unit 213.

The workspace editing unit 211 provides the user with various operational functions to be executed on a workspace. Using the workspace editing unit 211, a user can accomplish on a workspace various operations including referencing for documents associated with an anchor, operations to carry out printing, operations to generate, alter, arrange, copy or move an anchor, and operations regarding a workspace including generation of a new one. The state on the workspace is altered by these operations. The altered state and the operation performed to achieve the alteration are stored into the workspace history managing unit 112.

The workspace selecting unit 212 selects the workspaces whose outlines are to be extracted. In this embodiment, the range of selection is set by a statement in the synthesis rules. An operation to select workspaces is executed as a preliminary step for operations by the document synthesis unit 213.

The document synthesis unit 213 searches the workspaces selected by the workspace selecting unit 212, and extracts workspaces and documents in accordance with the synthesis rules, and generates a synthesized document provided with links to the extracted workspaces and documents.

FIG. 9 is the first half of a flowchart showing the procedure of processing workspace selection and synthesis. This flowchart shows a processing sequence started when either an outline extracting instruction is entered from the input/output control unit 220 or a requirement for information updating set by the synthesis rules has been satisfied. Incidentally, when it is to be executed by an outline extracting instruction, the synthesis rule in accordance with which the document synthesis is to be accomplished is designated.

[S1] The document synthesis unit 213 generates an HTML document, and outputs to the HTML document a start tag for a body indicating the contents to be displayed as a page.

[S2] The document synthesis unit 213 reads in the designated synthesis rule out of the synthesis rules holding unit 113.

[S3] The document synthesis unit 213 outputs to the HTML document the name of the rule set in "generic/rule name" of the synthesis rules that have been read in.

[S4] The document synthesis unit 213 outputs to the HTML document the name of the workspace set in "generic/workspace" of the synthesis rules that have been read in.

[S5] The workspace selecting unit 212 defines a selection of variables indicating the selected workspace, and adds to the selection of variables the name of the workspace set in "generic/workspace" of the synthesis rules that have been read in.

[S6] The workspace selecting unit 212 confirms the value set in "generic/derive" of the synthesis rules that have been read in and, if it is any other value than "0", adds to the selection of variables the derived workspaces up to that number of steps.

[S7] The workspace selecting unit 212 confirms the value set in "generic/influence" of the synthesis rules that have been read in and, if it is any other value than "0", adds to the selection of variables the workspaces whose anchors have been moved up to that number of steps.

[S8] The document synthesis unit 213 outputs a heading "hot links" to the HTML document.

[S9] The document synthesis unit 213 searches the workspace history managing unit 112 for the workspaces set before the selection, and successively applies the extraction rules of "hot links" category within the extent of those workspaces.

Figure 10:
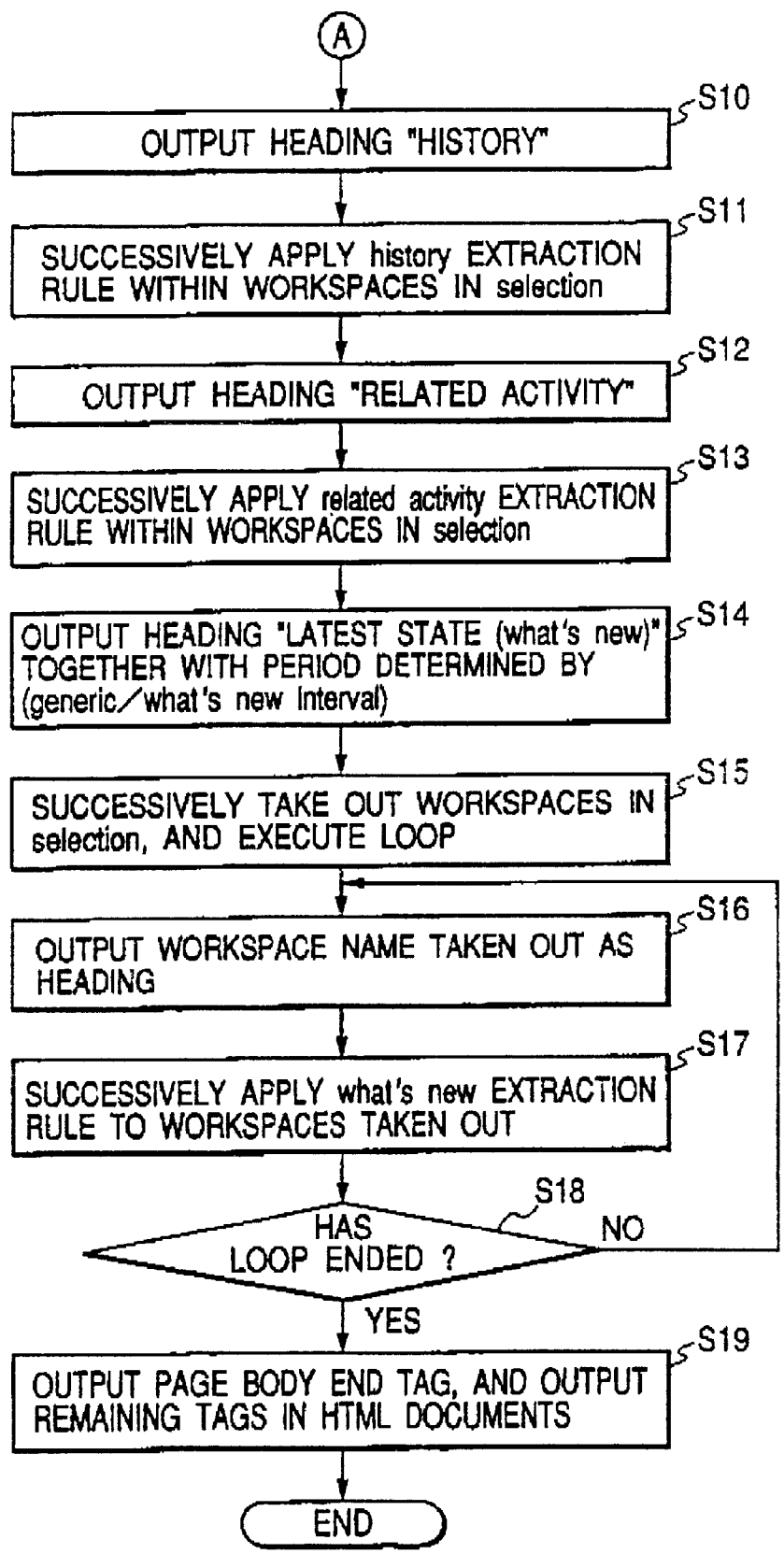
FIG. 10 is the second half of the flowchart showing the procedure of processing workspace selection and synthesis.

FIG. 10 is the second half of the flowchart showing the procedure of processing workspace selection and synthesis.

[S10] The document synthesis unit 213 outputs the "history" of headings to the HTML document.

[S11] The document synthesis unit 213 successively applies the extraction rules of "history" category within the extent of workspaces set in the selection.

[S12] The document synthesis unit 213 outputs the heading "related activity" to the HTML document.

[S13] The document synthesis unit 213 successively applies the extraction rules of "related activity" category within the extent of workspaces set in the selection.

[S14] The document synthesis unit 213 outputs the heading "latest state (what's new)" together with a period determined by "generic/what's new interval".

[S15] The document synthesis unit 213 successively takes out workspaces set in the selection from the workspace history managing unit 112, and executes the following steps S16 and S17 repeatedly.

[S16] The document synthesis unit 213 outputs to the HTML document the workspace name taken out as the heading.

[S17] The document synthesis unit 213 successively applies the extraction rules of "what's new" category to the workspaces that have been taken out.

[S18] The document synthesis unit 213 judges whether or not further repetition of the loop is necessary. Thus it judges whether or not the workspaces taken out at step S15 include those which have not yet been processed at steps S16 and S17. If there is any unprocessed workspace, the processing goes on to step S16 or, if all the workspaces have been processed, to step S19.

[S19] The document synthesis unit 213 outputs to the HTML document an end tag for a body indicating the contents to be displayed as a page and, at the same time, outputs the remaining tags of HTML to the HTML document to end the processing.

Referring back to FIG. 3, the functions of the input/output control unit 220 will be described.

The input/output control unit 220 input/outputs various information pertaining to workspaces with an input/output device such as a display, a keyboard or a mouse and a user interface taking charge of basic operations by the input/output device, such as a window system.

A workspace display unit 221 displays the latest, or a designated past, state of the workspace. A workspace in this embodiment uses a usual desktop metaphor in which icons are arranged in a plane.

An operation instructing unit 222 instructs what operations should be applied to an anchor, a document referenced by an anchor, a workspace of the like via the interface of the workspace. In this embodiment, an operation is instructed by selecting the icon to be operated upon and selecting a menu or a button.

A synthesis rules input unit 223 is an interface for entering the synthesis rules.

A synthesized document display unit 224 displays a synthesized document. In this embodiment, by having HTTP designate the address corresponding to the synthesis rule, a standard WWW browser is caused to display the synthesized document. The user displaying the synthesized document need not be the same as the user who defined the synthesis rule. When a person is to open the contents of hie or her activities, the person, who defined the synthesis rule, waits for accessing by other persons.

In a system having the above-described configuration, when a user utilizing the client computer 200 performs a task using a workspace, its history is managed by the workspace history managing unit 112 of the server computer 100.

A specific example of the work execution process on a workspace will be described below. A document is synthesized from data accumulated through this specific execution process. It has to be noted here that all the manipulation done in this example has its own meaning in the work to be essentially performed by the user, but is not done primarily for synthesis of a document.

Figure 11:
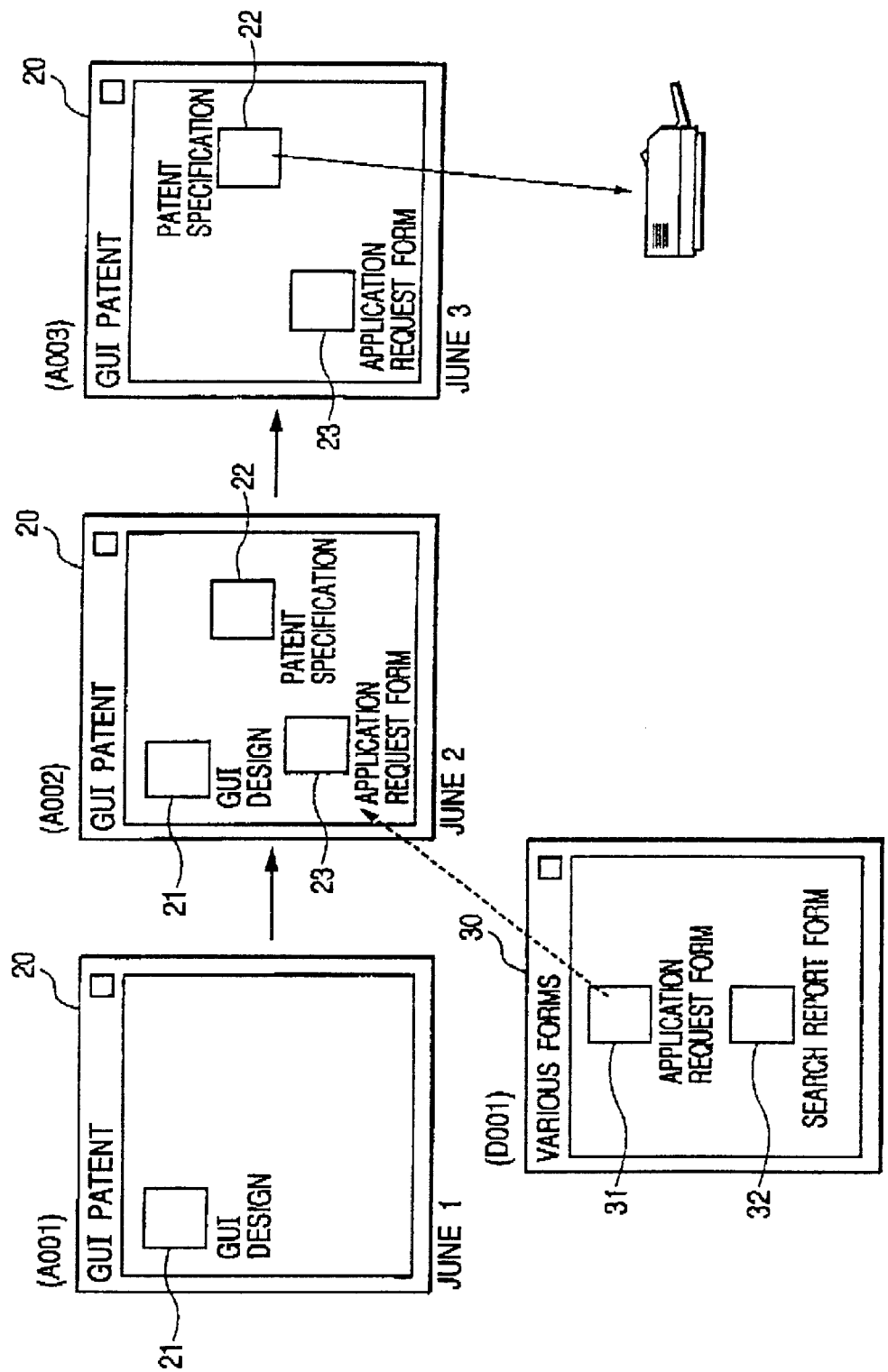
FIG. 11 illustrates an example of work execution of "GUI patent" on a workspace.

FIG. 11 illustrates an example of work execution of "GUI patent" on a workspace. The workspace 20 of "GUI patent" is a workspace for writing a patent specification regarding an invention carried out in connection with a GUI for use in a prototype system under development. Incidentally, the parenthesized sign above the top left corner of the workspace 20 is the identifier of the state of the workspace (snapshot).

June 1 (Snapshot ID=A001)

The user creates a "GUI patent" workspace 20, on which he or she prepares a document to be referenced by an anchor named "GUI design". This document is a temporary memo, for use in writing a patent specification, to summarize features of GUI of a workspace system under development. The user edits a document on "GUI design".

June 2 (Snapshot ID=A002)

The user creates a document named "patent specification" to be referenced by an anchor 22. This document is intended for stating a patent specification based on an idea coordinated by "GUI design". The user edits the document of "patent specification". Further, the user copies onto the workspace 20 a document referenced by an anchor 31 named "application request form" out of two anchors 31 and 32 contained in a workspace 30 named "various forms". As a result, a new anchor 23 named "application request form" is generated in the workspace 20. This document is a form for use in applying for a patent. The user edits the "application request form".

June 3 (Snapshot ID=A003)

The user removes the document of "GUI design" which has finished serving its purpose. This makes the anchor 21 disappear. The user prints out the "patent specification" for submission.

Figure 12:
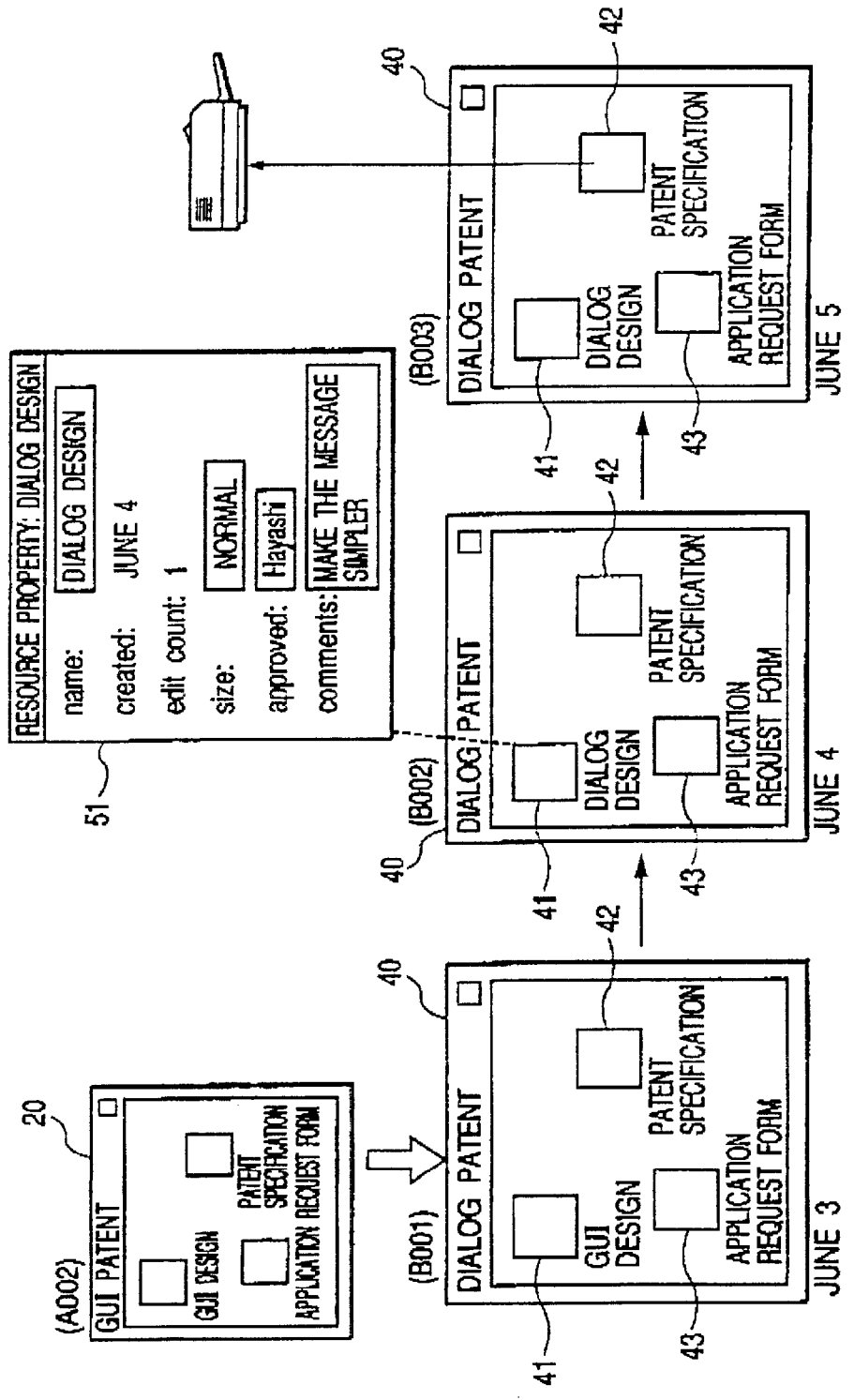
FIG. 12 illustrates an example of work execution of "dialog patent" on a workspace.

FIG. 12 is illustrates an example of work execution of "dialog patent" on a workspace. The workspace of "dialog patent" is intended for writing thereon a patent regarding a dialog for use in a prototype system under development. In the course of writing a patent on GUI, it has been decided to apply for a separate patent on the dialog.

June 3 (Snapshot ID=B001)

"GUI patent" defines a new workspace 40 "dialog patent" from the state of the workspace 20 as of June 2 (A002) as a succeeding workspace. This workspace 40 starts from the newly created state of the "GUI patent" workspace 20 as its initial state. Therefore the same anchors 41 to 43 as those contained in the workspace 20 are contained therein. Succeeding in this way the document used when the GUI patent was written facilitates starting up the work. The user adds what would constitute contents of a new patent into the document to be referenced by the anchor 42 of the "patent specification".

June 4 (Snapshot ID=B002)

The user further edits documents to be referenced by the anchor of the "patent specification". Next, after altering the name of the anchor 41 from "GUI design" to "dialog design", the user further edits documents to be referenced by the anchor 41 of the "dialog design". Renaming is carried out by the use of the user interface 51 of the resource property.

The user interface 51 is intended for use in displaying and editing the data structure of anchors. In this example, a name (name), date and time of creation (created), the number of times of updating (edit count), icon size (size), approval attribute (approved) and comments attribute (comments) are displayed. The user, in addition to renaming the anchors, obtains approval of Hayashi, who is his or her superior, regarding the contents, and inputs the data of "Hayashi" to the approval (approved) attribute of the anchor property to have the approval reflected. The user further enters any comment given with the approval into the comments (comments) attribute. The comments attribute is intended for entering and recording, in a text form, information pertaining to the state at that point of time. In this example, a comment "make the message simpler" is entered.

June 5 (Snapshot ID=B003)

The user prints out the anchor 42 of the "patent specification" after further editing it.

Figure 13:
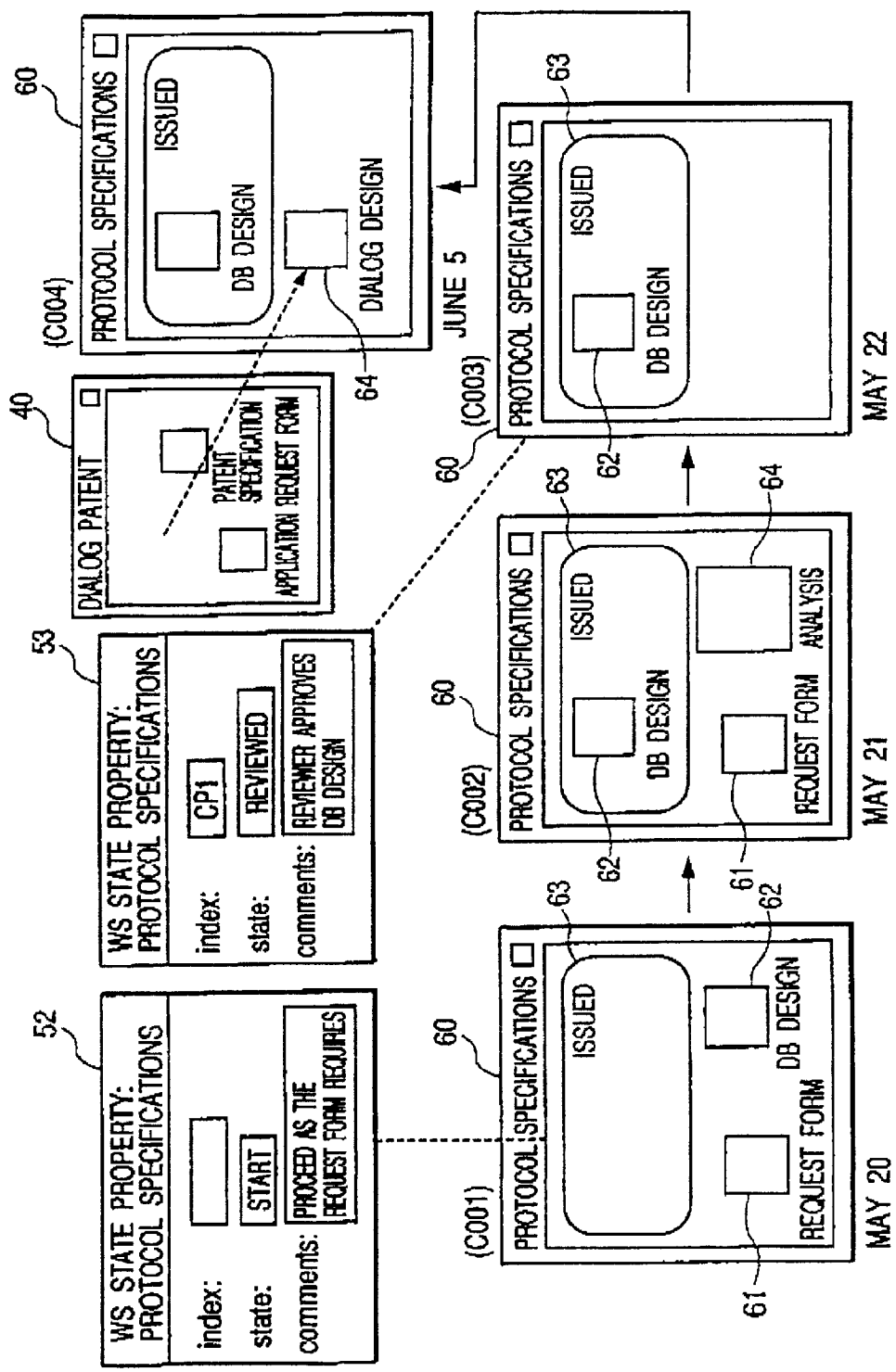
FIG. 13 illustrates an example of work execution of "prototype specifications" on a workspace.

FIG. 13 illustrates an example of work execution of "prototype specifications" on a workspace. The workspace 60 of the "prototype specifications" is intended for preparing the specifications of a prototype system under development. This activity is temporarily suspended during the period of patent wring activity, and resumed afterwards.

May 20 (Snapshot ID=C001)

The user generates the workspace 60 of the "prototype specifications". A number of attributes representing the state of the workspace 60 at this time are set using the user interface 52 of the WS state property. Here, a state (state) attribute and a comments (comments) attribute are set. A state attribute shows in what state that workspace is in the work process. In this example, "start" is set out of the available alternatives of "start", "reviewed" and "end". A comments attribute is defined for both the anchor and the workspace, and both are used for recording any desired text entered by the user. In this example, a memo "proceed as the request form requires" is entered as the comments attribute.

Then, a "request form" document is created and edited. This causes the anchor 61 to the document of the "request form" to be created. This is a document for putting contents in order regarding a request to be complied with, and the work is proceeded on the basis of the contents put in order here. Then, a "DB design" document is created and edited. The anchor 62 to the document of "DB design" is thereby generated. This document pertains to the database design of the prototype system under development. Further, a region (region) 63 named "issued" for arranging an issued document is defined.

May 21 (Snapshot ID=C002)

The user further creates and edits an "analysis" document. This causes the anchor 64 to the document of the "analysis" document to be created. This document is for temporary use to perform calculations to analyze the designed database. By setting the icon size attribute (size) of the anchor 64 for referencing the "analysis" document to be "LARGE", a relatively large icon is displayed. After the results of performance analysis are confirmed, a move to an "issued" region 63 takes place to formally issue the "DB design" document.

May 22 (Snapshot ID=C003)

After the "DB design" document is internally reviewed and approved, "request form" and "analysis", both temporary documents, are removed. As a result, two anchors 61 and 64 disappear, Further, using the user interface 53 of the state property, the user enters values into the index attribute (index), state attribute (state) and comments attribute (comments) of the property. The index attribute gives an index, which serves as the key for referencing the state of the workspace. In this example, there is entered an index "CP1" meaning that the first check point has been passed. This value is given only to the state at this point of time, but not succeeded as the index attribute of the ensuing next state. Further the state attribute is altered to "reviewed", and a text "reviewer approves DB design" is entered as the comments attribute.

June 5 (Snapshot ID=C004)

The user resumes the activity suspended during patent writing by moving the "dialog design" document from the workspace 40 of "dialog patent". The user moves the anchor for referencing the "dialog design" whose consideration had progressed through the patent writing from the workspace 40 of the "dialog patent" to the workspace 60 of the "prototype specifications". As a result, the anchor 64 to the "dialog design" is added to the workspace 60. The user continues the ensuing designing activities by further editing the "dialog design" document.

Accomplishment of these tasks results in the holding of the history of operations as shown in FIG. 7 by the workspace history managing unit 112.

Here is considered an instance in which the progress of tasks accomplished by one user having performed the operations shown in FIGS. 11 to 13 is checked by another user. In that case, the appropriate synthesis rule for the purpose is designated by using the synthesis rules input unit 223. The state of designation of a synthesis rule will be described below with reference to a specific example.

Figure 14:
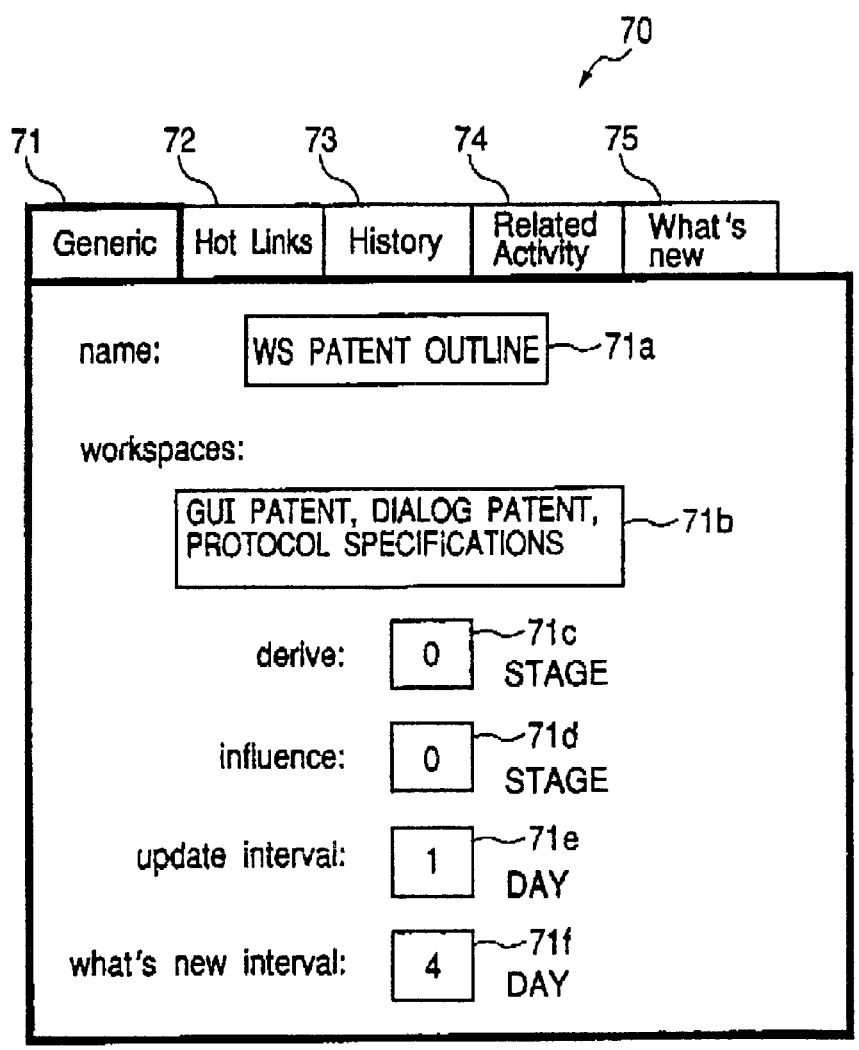
FIG. 14 is the first screen image illustrating the state of inputting a synthesis rule.

FIG. 14 is the first screen image illustrating the state of inputting synthesis rules. When entering a synthesis rule, a synthesis rule entering dialog box 70 is displayed on the screen. The synthesis rule inputting dialog box 70 is provided with boxes 71 to 75 of "Generic", "Hot Links", "History", "Related Activity" and "What's new", respectively. FIG. 14 illustrates a state in which the box 71 "Generic" is selected. The box 71 "Generic" has six text boxes 71a to 71f for entering values belonging to the "generic" category.

A string of characters entered into the text box 71a is set as the value of the synthesis rule "generic/rule name". A string of characters entered into the text box 71b is set as the value of the synthesis rule "generic/workspace". A numerical value entered into the text box 71c is set as the value of the synthesis rule "generic/derive". A numerical value entered into the text box 71d is set as the value of the synthesis rule "generic/influence". A numerical value entered into the text box 71e is set as the value of the synthesis rule "generic/update interval". A numerical value entered into the text box 71f is set as the value of the synthesis rule "generic/what's new interval".

Figure 15:
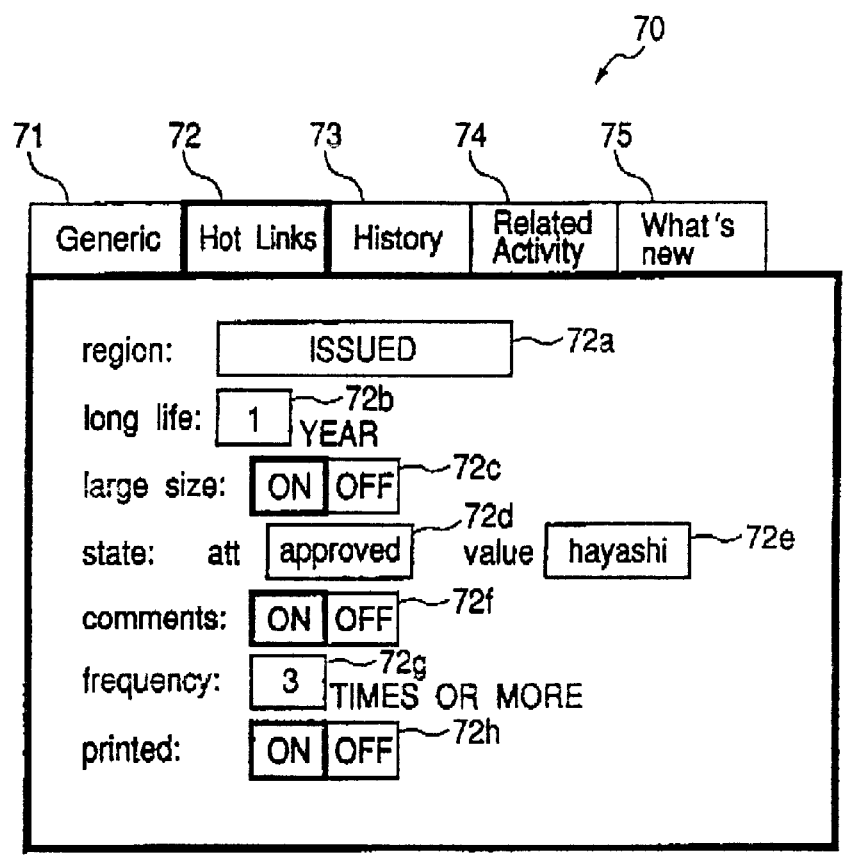
FIG. 15 is the second screen image illustrating the state of inputting synthesis rules.

FIG. 15 is the second screen image illustrating the state of inputting synthesis rules. The image illustrates a state in which the box 72 "Hot Links" is selected. The box 72 "Hot Links" is provided with text boxes 72a, 72b, 72d, 72e and 72g for entering values belonging to the "hot links" category and buttons 72c, 72f and 72h for selecting "ON" or "OFF".

A string of characters entered into the text box 72a is set as the value of the synthesis rule "hot links/region". A string of characters entered into the text box 72b is set as the value of the synthesis rule "hot links/long life". The value for which the button 72c is selected is set as the value of the synthesis rule "hot links/large size". A string of characters entered into the text box 72d is set as a first string of characters of the synthesis rule "hot links/state". A string of characters entered into the text box 72e is set as a second string of characters of the synthesis rule "hot links/state". The value for which the button 72f is selected is set as the value of the synthesis rule "hot links/comments". A value entered into the text box 72g is set as the value of the synthesis rule "hot links/frequency". The value for which the button 72h is selected is set as the value of the synthesis rule "hot links/print".

Figure 16:
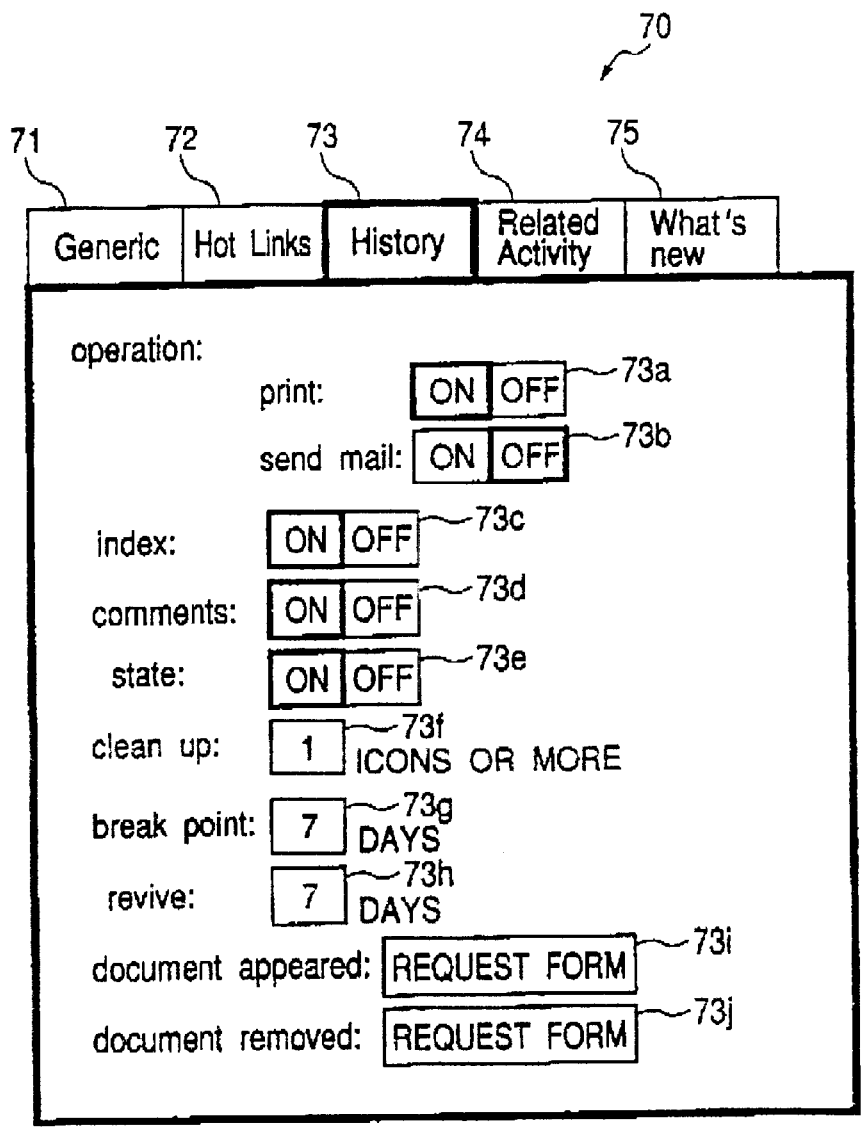
FIG. 16 is the third screen image illustrating the state of inputting synthesis rules.

FIG. 16 in the third screen image illustrating the state of inputting synthesis rules. The image illustrates a state in which the box 73 "History" is selected, The box 73 "History" is provided with text boxes 73f to 73j for entering values belonging to the "history" category and buttons 73a to 73e for selecting "ON" or "OFF".

The value for which the button 73a is selected is set as the value of the synthesis rule "history/operation print". The value for which the button 73b is selected is set as the value of the synthesis rule "history/operation send mail". The value for which the button 73c is selected is set as the value of the synthesis rule "history/index". The value for which the button 73d is selected is set as the value of the synthesis rule "history/comments". The value for which the button 73e is selected as the value of the synthesis rule "history/state". A numerical value entered into the text box 73f is set as the value of the synthesis rule "history/clean up". A numerical value entered into the text box 73g is set as the value of the synthesis rule "history/break point". A numerical value entered into the text box 73h is set as the value of the synthesis rule "history/revive". A string of characters entered into the text box 73i is set as the value of the synthesis rule "history/document appeared". A string of characters entered into the text box 73j is set as the value of the synthesis rule "history/document removed".

Figure 17:
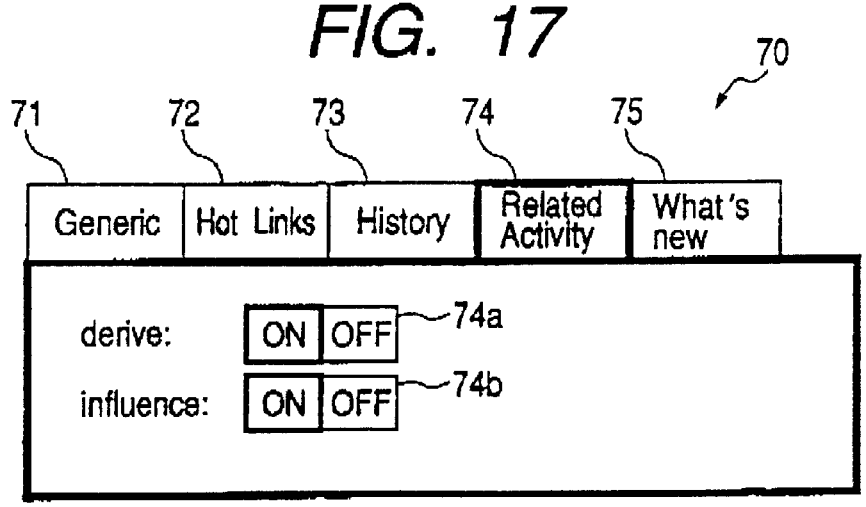
FIG. 17 is the fourth screen image illustrating the state of inputting synthesis rules.

FIG. 17 is the fourth screen image illustrating the state of inputting synthesis rules. The image illustrates a state in which the box 74 "Related Activity" in selected. The box 74 "Related Activity" is provided with buttons 74a and 74b for selecting "ON" or "OFF" to enter values belonging to the "related activity" category.

The value for which the button 74a is selected is set as the value of the synthesis rule "related activity/derive". The value for which the button 74b is selected is set as the value of the synthesis rule "related activity/influence".

Figure 18:
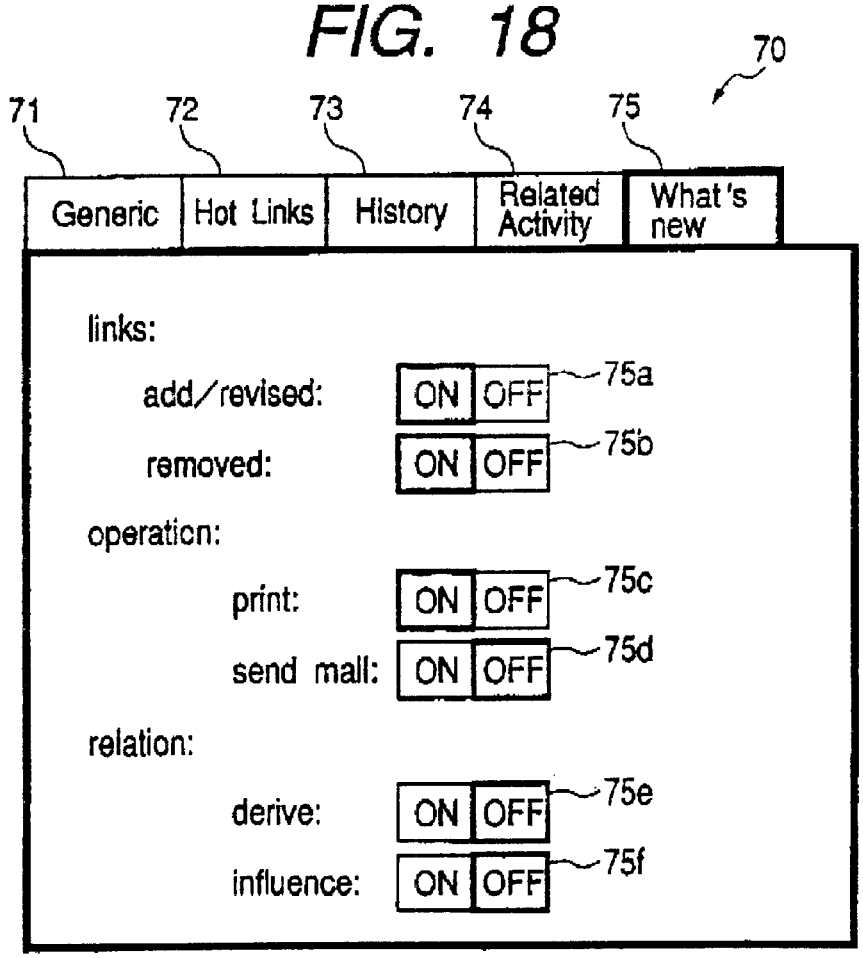
FIG. 18 is the fifth screen image illustrating the state of inputting synthesis rules.

FIG. 18 is the fifth screen image illustrating the state of inputting synthesis rules. The image illustrates a state in which the box 75 "What's new" is selected. The box 75 "What's new" is provided with buttons 75a to 75f for selecting "ON" or "OFF" to enter values belonging to the "what's new category".

The value for which the button 75a is selected is set as the value of the synthesis rule "what's new/links add/revised". The value for which the button 75b is selected as the value of the synthesis rule "what's new/links removed". The value for which the button 75c is selected is set as the value of the synthesis rule "what's new/operation print". The value for which the button 75d is selected is set as the value of the synthesis rule "what's new/operation send mail". The value for which the button 75e is selected is set as the value of the synthesis rule "what's new/relation derive". The value for which the button 75f is selected is set as the value of the synthesis rules "what's new/relation influence".

As a result of entering the synthesis rules as shown in FIGS. 14 to 18, the synthesis rules illustrated in FIG. 6 are stored into the synthesis rules holding unit 113. Then, the user, employing the synthesized document display unit 224, enters an outline extracting command. By designating "WS patent outline" as the name of the synthesis rules then, outline extraction processing in accordance with the synthesis rules illustrated in FIG. 8 is carried out by the workspace selecting unit 212 and the document synthesis unit 213. As a result, documents showing outlines of work as shown in FIGS. 11 to 13 are displayed on the display unit of the client computer 200.

Figure 19:
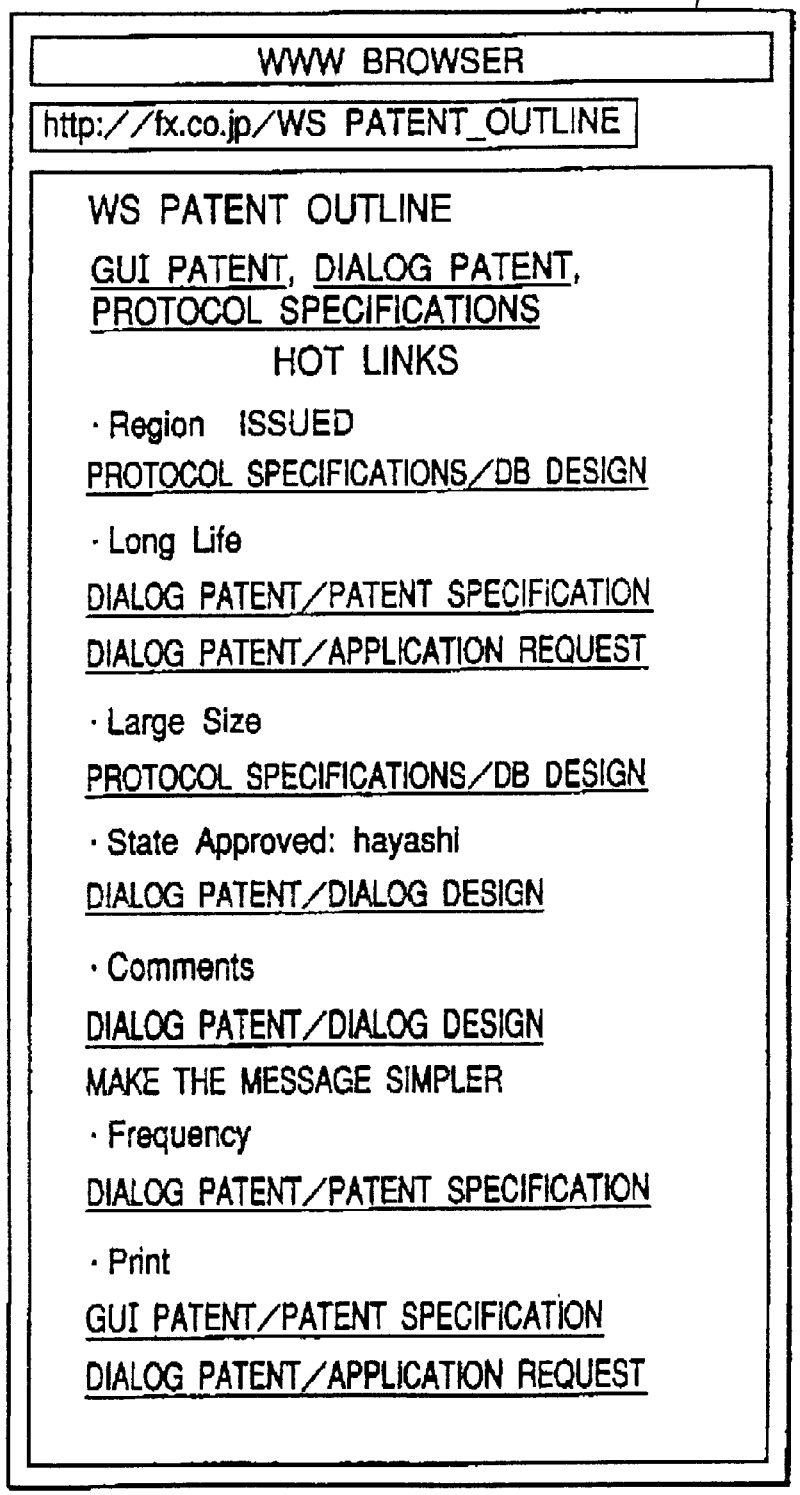
FIG. 19 illustrates a screen displaying an outline of hot links.

FIG. 19 illustrates a screen displaying an outline of hot links. The hot links outline displaying screen 81 is displayed on the display unit by WWW browser. In the frame is displayed the name of the synthesis rule, under which is shown the name of the workspace designated to be searched. The name of the workspace is underlined. The underline indicates that there is a link to the information to be referred. Under it is stated "hot links", and the names of documents extracted in accordance with the rule concerning the "hot links" category are displayed, being matched with the rules in accordance with which they were respectively extracted. Further, a link to the pertinent document is set at the displayed name of each document.

Figure 20:
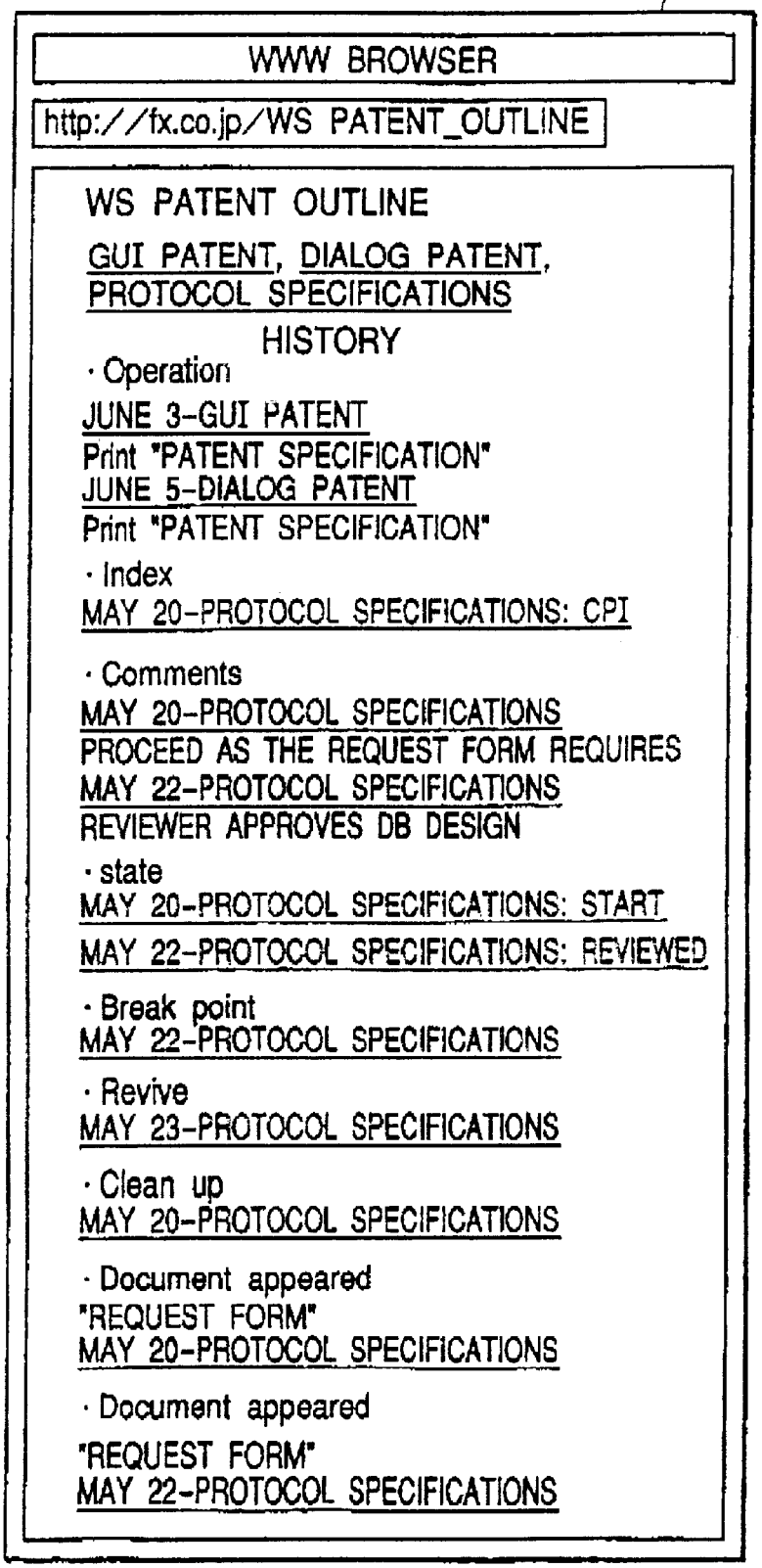
FIG. 20 illustrates a screen displaying an outline of history.

FIG. 20 illustrates a screen displaying an outline of history. The history outline displaying screen 82 is marked "history", and the names of documents extracted in accordance with the rule concerning the "history" category are displayed, being matched with the rules in accordance with which they were respectively extracted. Further, a link to the pertinent document in set at the displayed name of each document.

Figure 21:
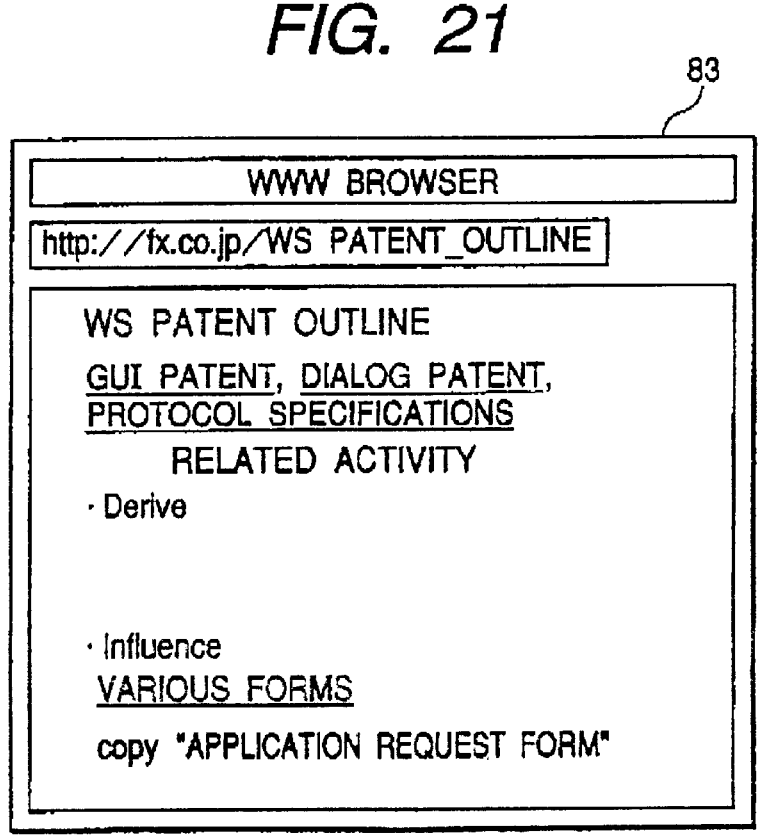
FIG. 21 illustrates a screen displaying an outline of a related activity.

FIG. 21 illustrates a screen displaying an outline of related activity. The related activity outline displaying screen 83 is marked "related activity", and the names of documents extracted in accordance with the rule concerning the "related activity" category are displayed, being matched with the rules in accordance with which they were respectively extracted. A date is added to the names of the documents. Further, a link to the pertinent document at the time of the added date is set at the displayed name of each document.

Figure 22:
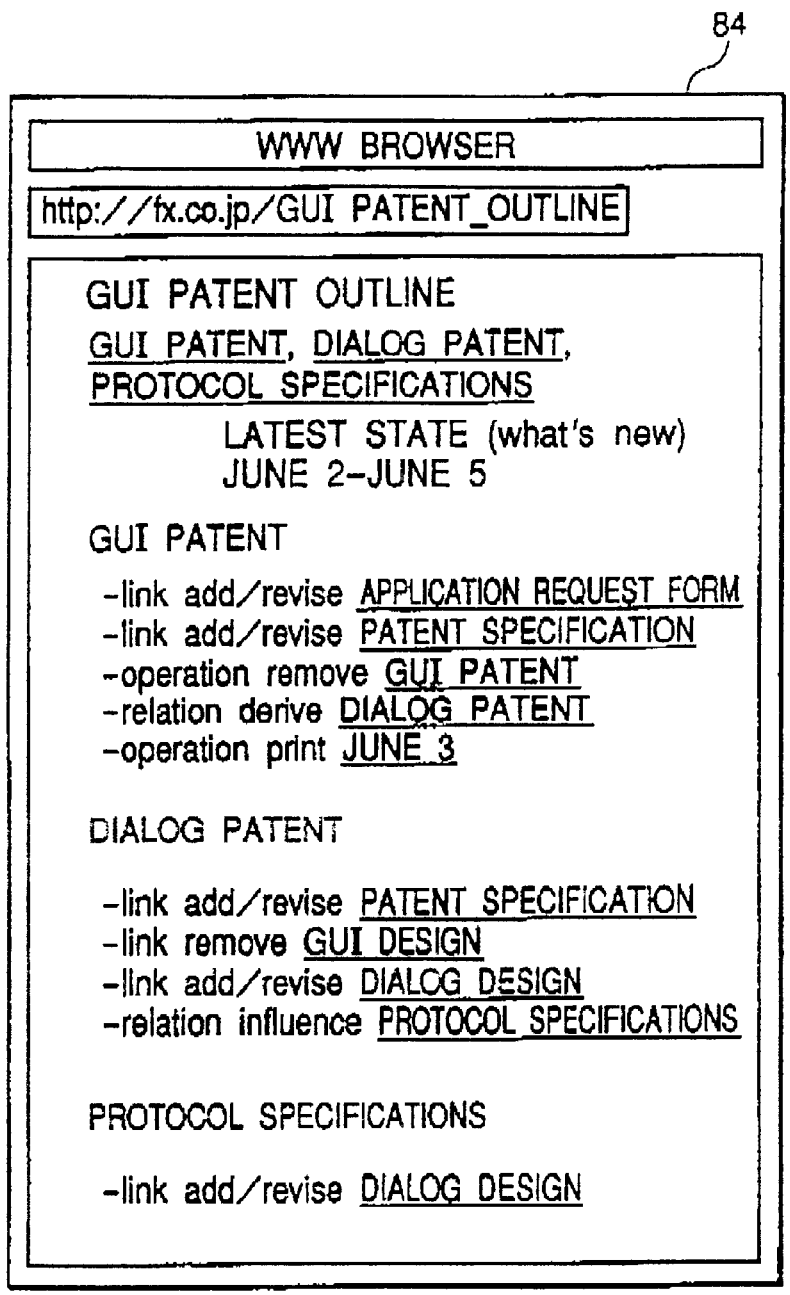
FIG. 22 illustrates a screen displaying an outline of the latest state.

FIG. 22 illustrates a screen displaying an outline of the latest state. The latest state outline displaying screen 84 is marked "latest state (what's new)", under which the period during which the extraction took place is stated. The names of documents extracted in accordance with the rule concerning the "latest state (what's new)" category are displayed, being matched with the rules in accordance with which they were respectively extracted. Further, a link to the pertinent document is set at the displayed name of each document.

Although the above description referred to the screens of FIG. 19 to FIG. 22 as if they were separate frames, actually a document showing outlines is generated as a single document, and the frames of FIGS. 19 to 22 can be switched from one to another by scrolling the screen.

Next, it will be explained how the displayed outline contents will vary when the applied synthesis rules are changed little by little.

First is considered a case in which the workspace to be selected (generic/workspaces) is set for "GUI patent" alone.

Figure 23:
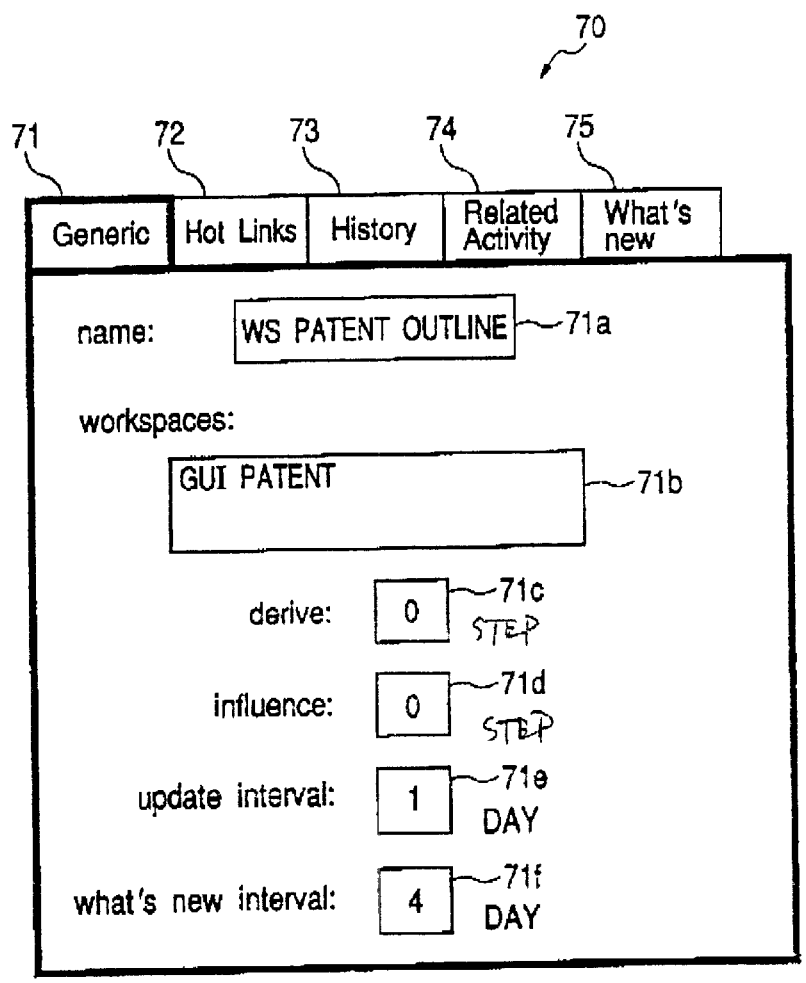
FIG. 23 illustrates the state or inputting under the synthesis rules at the time of altering the workspace to be selected.

FIG. 23 illustrates the state of inputting under the synthesis rules at the time of altering the workspace to be selected. While FIG. 14 showed a case in which "GUI patent, dialog patent, prototype specifications" were entered in the text box 71b, the contents are changed to "GUI patent". This alters the workspace designated to be searched, which is then confined to "GUI patent" alone.

If outline extraction is carried out on June 5 under such synthesis rules, the outline of the related activity will change to what is stated below.

Figure 24:
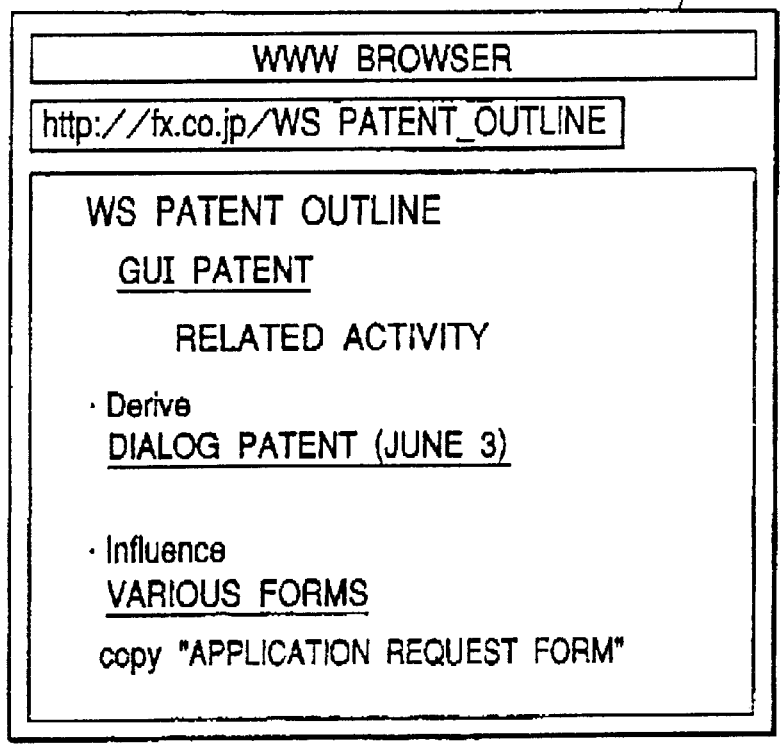
FIG. 24 illustrates a screen displaying an outline of a related activity when "GUI patent" is selected.

FIG. 24 illustrates a screen displaying an outline of related activity wherein "GUI patent" is selected. Comparing this outline displaying screen 85 with the outline displaying screen 83 illustrated in FIG. 21, it is seen that the workspace of "dialog patent (June 3)" in the relationship of derivation is newly extracted under the synthesis rule "related activity/derive". Thus, since "dialog patent" was designated to be searched under the synthesis rules before the alteration, it was not to be extracted as a workspace in a relationship of derivation, but its removal from the designated range of searching has made it eligible for extraction as a workspace in a relationship of derivation.

In other outline displaying screens than that of related activity, information extracted from the workspaces of "dialog patent" and "prototype specifications" is no longer extracted. For instance, the outline displaying screen of the latest state looks like what is shown in FIG. 25.

Figure 25:
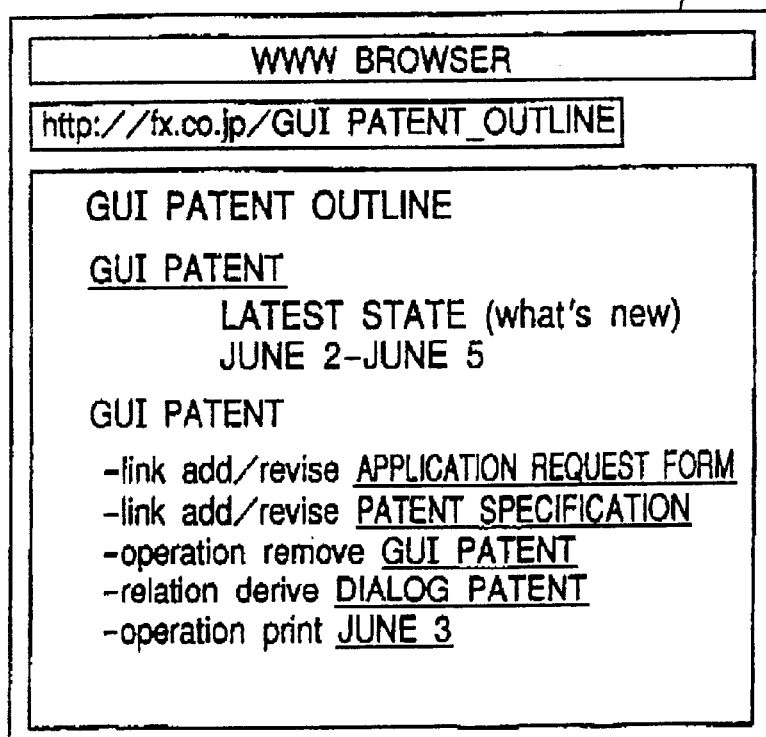
FIG. 25 illustrates a screen displaying an outline of the latest state when "GUI patent" is selected.

FIG. 25 illustrates a screen displaying an outline of the latest state wherein "GUI patent" is selected. Comparing this outline displaying screen 86 with the outline displaying screen 84 illustrated in FIG. 22, it is seen that the contents displayed regarding workspaces of "dialog patent" and "prototype specifications" have disappeared.

By narrowing down the scope of workspaces to be searched in this manner, more strictly selected information can be displayed on the screen.

Next is cited a case in which the value of the designated period (generic/what's new interval) in which to observe changes is supposed to be 3.

Figure 26:
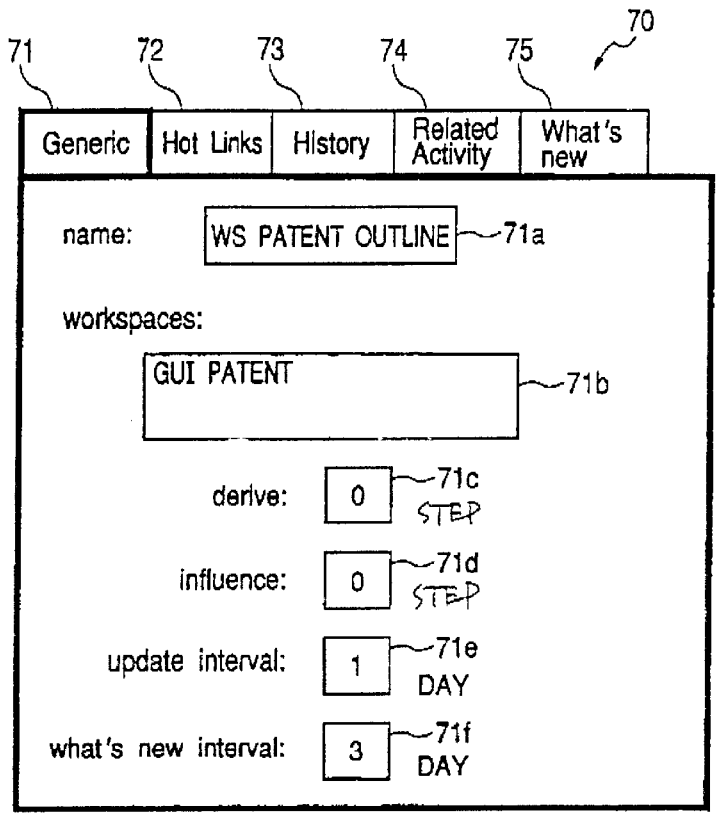
FIG. 26 illustrates the state of inputting under the synthesis rules when the period is designated to be "3 days"

FIG. 26 illustrates the state of inputting under the synthesis rules wherein the period is designated to be "3 days". In FIG. 23, "4" was entered in the text box 71f, but the content here is altered to "3". Accordingly, changes in the last three days are displayed as the outline.

Extracted under this synthesis rule, the outline of latest state changes as described below.

Figure 27:
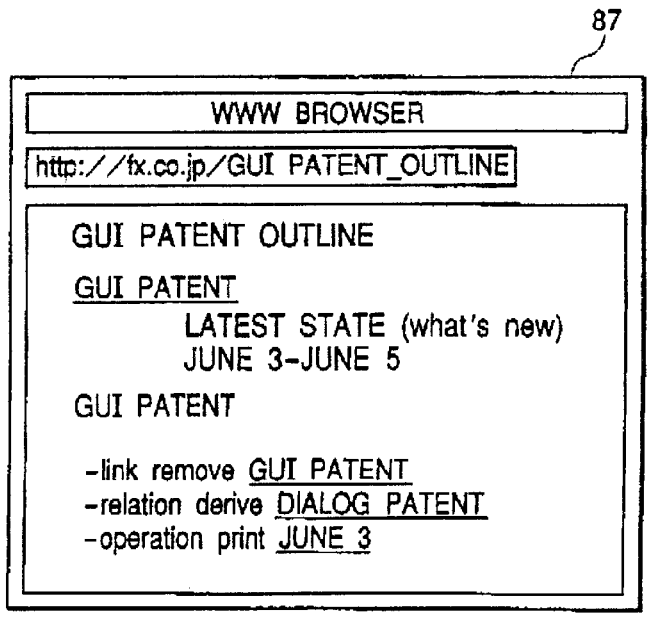
FIG. 27 illustrates a screen displaying an outline of the latest state wherein the period is designated to be "3 days"

FIG. 27 illustrates a screen displaying an outline of the latest state wherein the period is designated to be "3 days". Comparing this outline displaying screen 87 with the outline displaying screen 86 shown in FIG. 25, it is seen that entries "link add/revise application request form" and "link add/revise patent specification" have disappeared. As these documents were added to the workspace on June 2, they were off the designated period of three days.

Next is cited a case in which the designated period remains four days and the derived workspaces (derive) are to be searched up to two steps.

Figure 28:
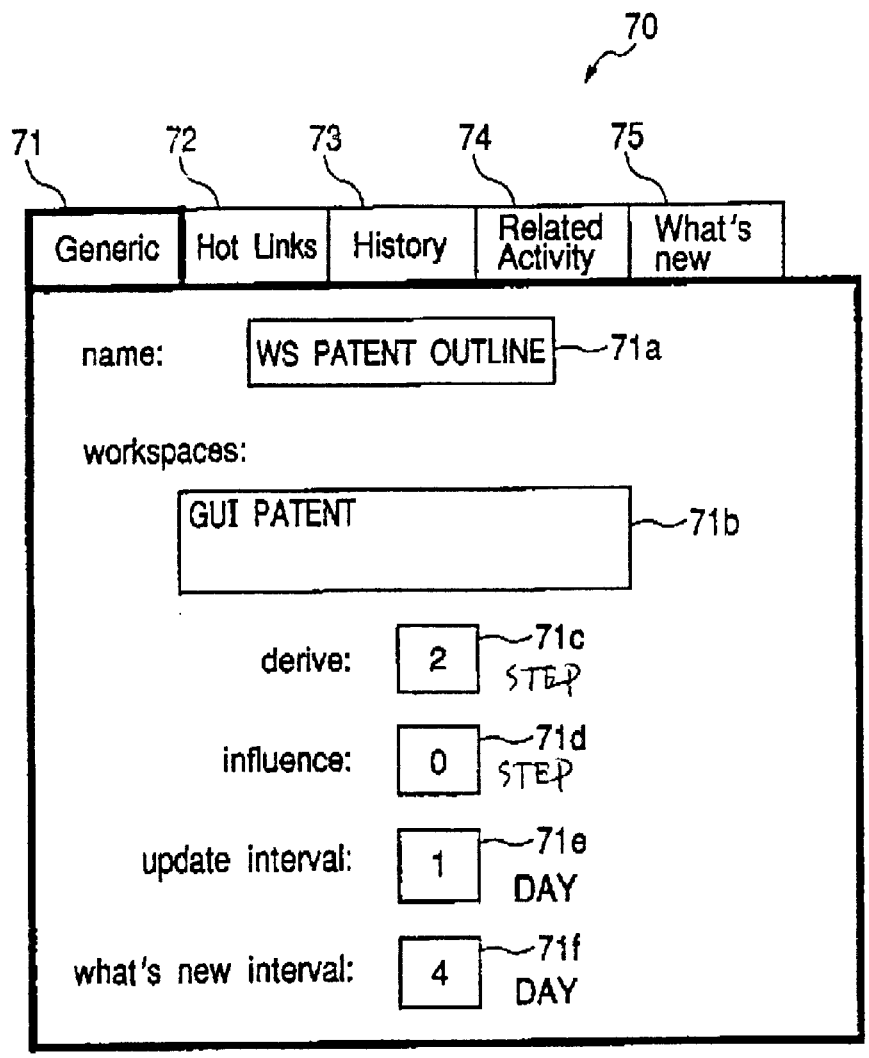
FIG. 28 illustrates the state of inputting under the synthesis rules wherein up to two steps of derived workspaces are to be searched.

FIG. 28 illustrates the state of inputting under the synthesis rules wherein up to two steps of derived workspaces are to be searched. While "0" was entered in the text box 71c in FIG. 23, the value is altered to "2" here. This results in displaying of an outline wherein up to two steps of derived workspaces are to be searched.

Extracted under this synthesis rule, the outline of latest state changes as described below.

Figure 29:
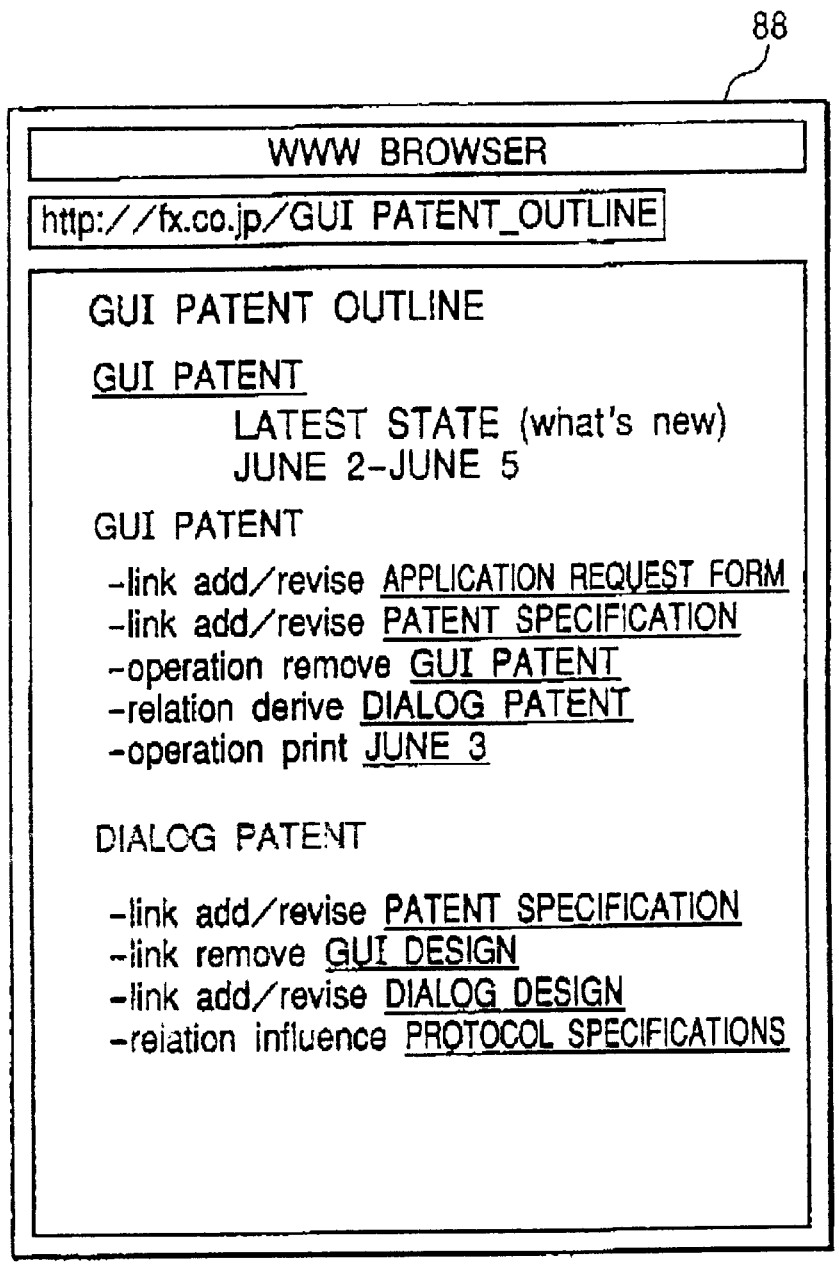
FIG. 29 illustrates a screen displaying an outline of the latest state wherein up to two steps of derived workspaces are to be searched.

FIG. 29 illustrates a screen displaying an outline of the latest state wherein up to two steps of derived workspaces are to be searched. Comparing this outline displaying screen 88 with the outline displaying screen 86 shown in FIG. 25, it is seen that the state of changes in the workspace of "dialog patent" is also displayed. This is because the workspace of "dialog patent" has derived from the workspace of "GUI patent".

Next is shown an instance in which the designation is made also to cover up to two steps of workspaces influenced by copying or moving (influence) from the state of FIG. 28.

Figure 30:
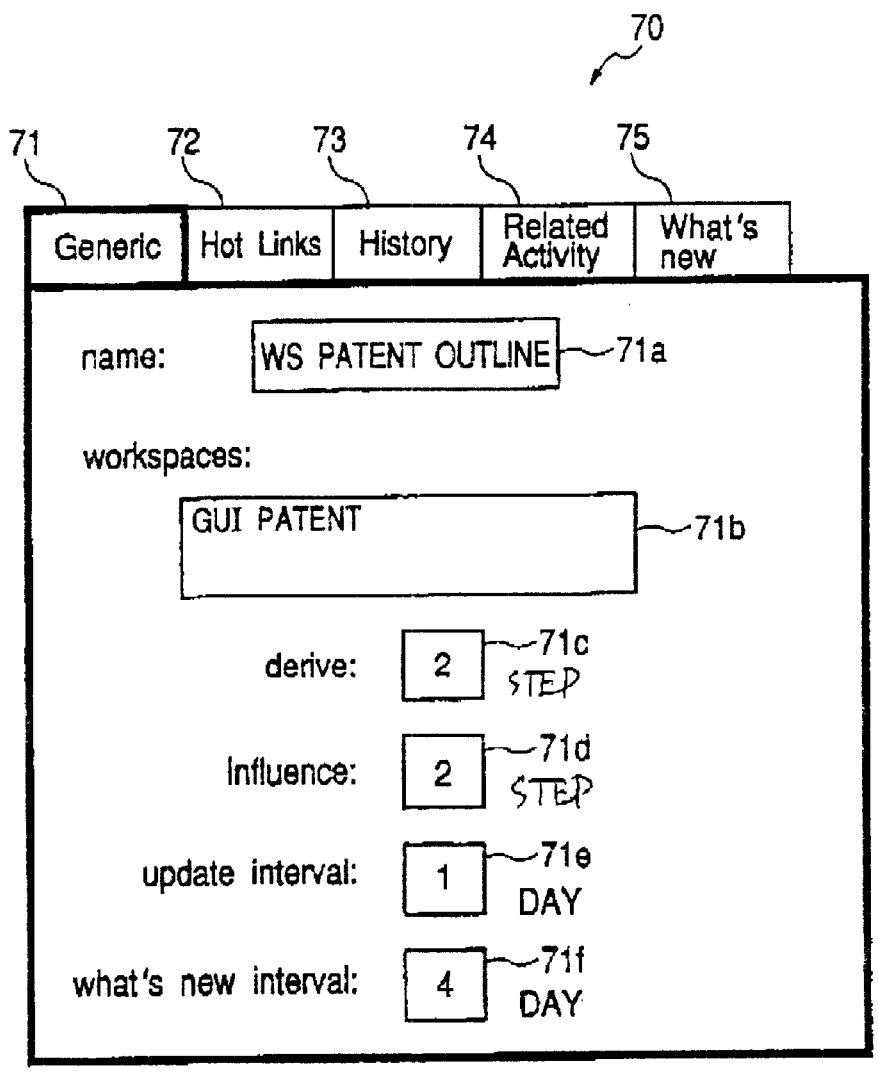
FIG. 30 illustrates the state of inputting under the synthesis rules wherein up to two steps of influenced workspaces are to be searched.

FIG. 30 illustrates the state of inputting under the synthesis rules wherein up to two steps of influenced workspaces are to be searched. While "0" was entered in the text box 71d in FIG. 28, the value is altered to "2" here. This results in displaying of an outline wherein up to two steps of influenced workspaces are to be searched.

Extracted under this synthesis rule, the outline of the latest state changes as described below.

Figure 31:
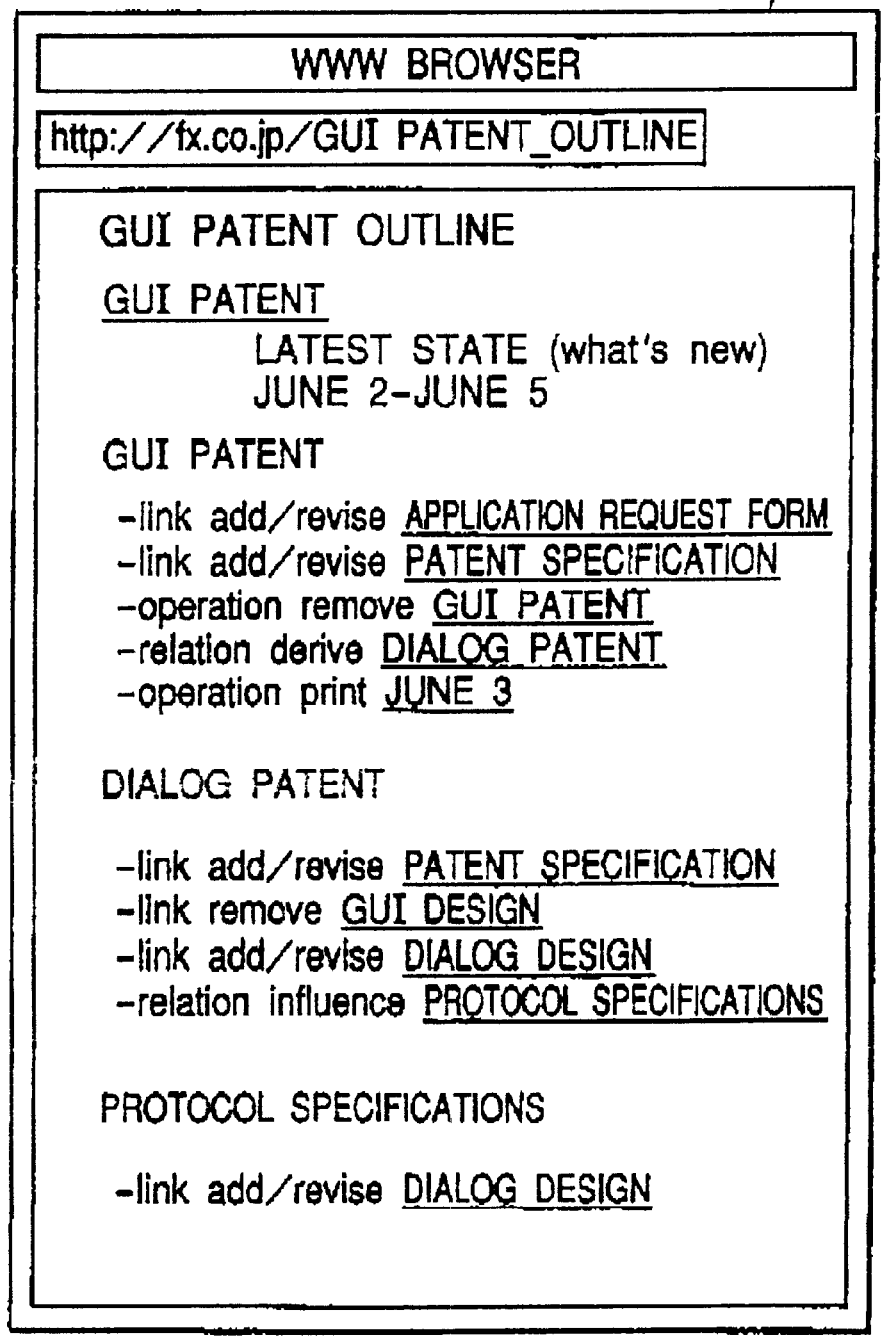
FIG. 31 illustrates a screen displaying an outline of latest state wherein up to two steps of derived workspaces are to be searched.

FIG. 31 illustrates a screen displaying an outline of the latest state wherein up to two steps of derived workspaces are to be searched. Comparing this outline displaying screen 89 with the outline displaying screen 88 shown in FIG. 29, it is seen that the state of changes in the workspace of "prototype specifications" is also displayed. This is because the workspace of the prototype specifications, contains a document moved from the workspace of "dialog patent".

While the extracted information is displayed in strings of characters on the outline displaying screens of the foregoing examples. it is also possible to graphically show the outlines.

Figure 32:
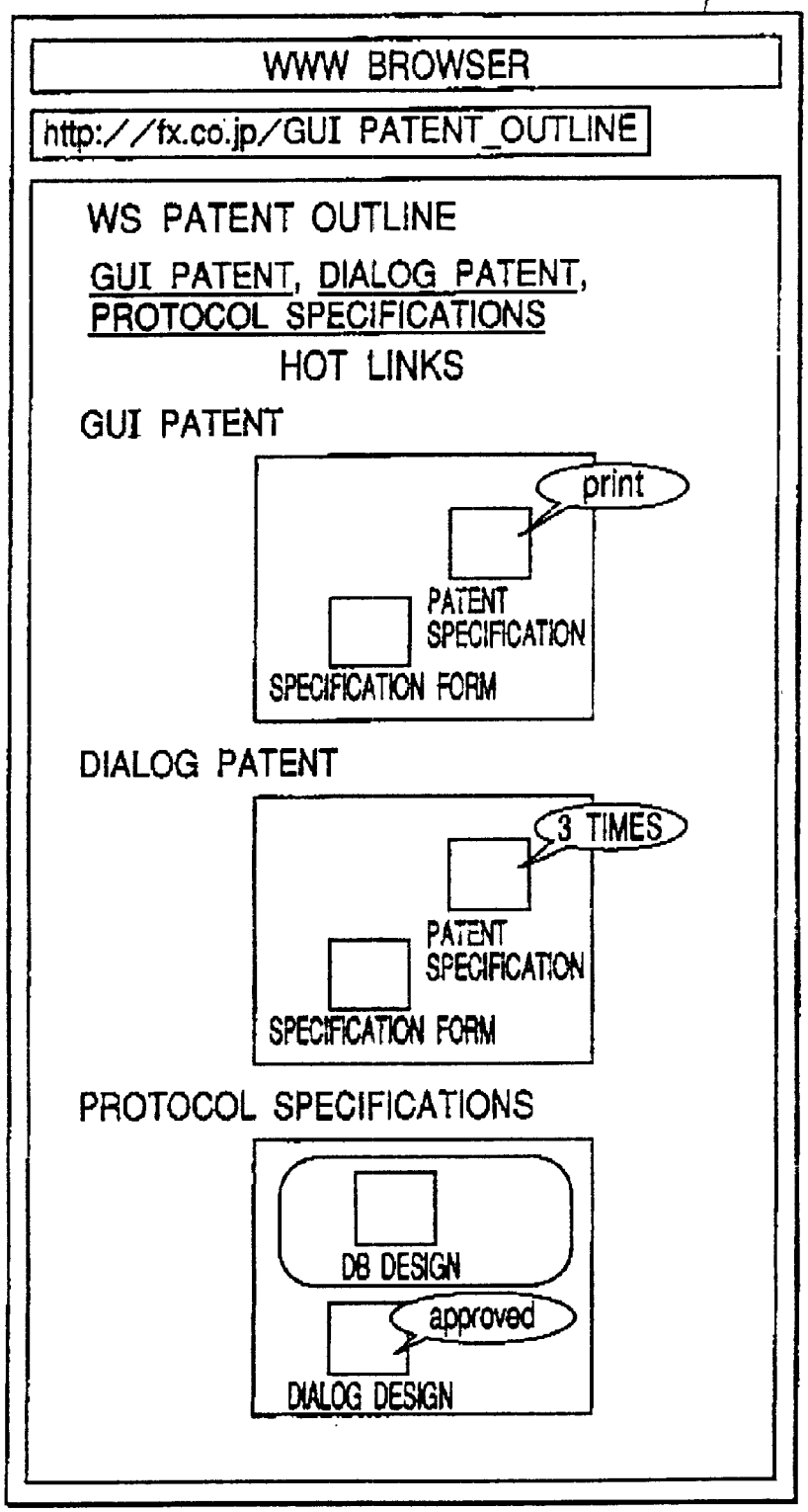
FIG. 32 illustrates the first example of screen graphically displaying an outline.

FIG. 32 illustrates the first example of screen graphically displaying an outline. On this outline displaying screen 91, each of the workspaces covered is displayed in a contracted form, and the anchors of important documents found there are marked.

Figure 33:
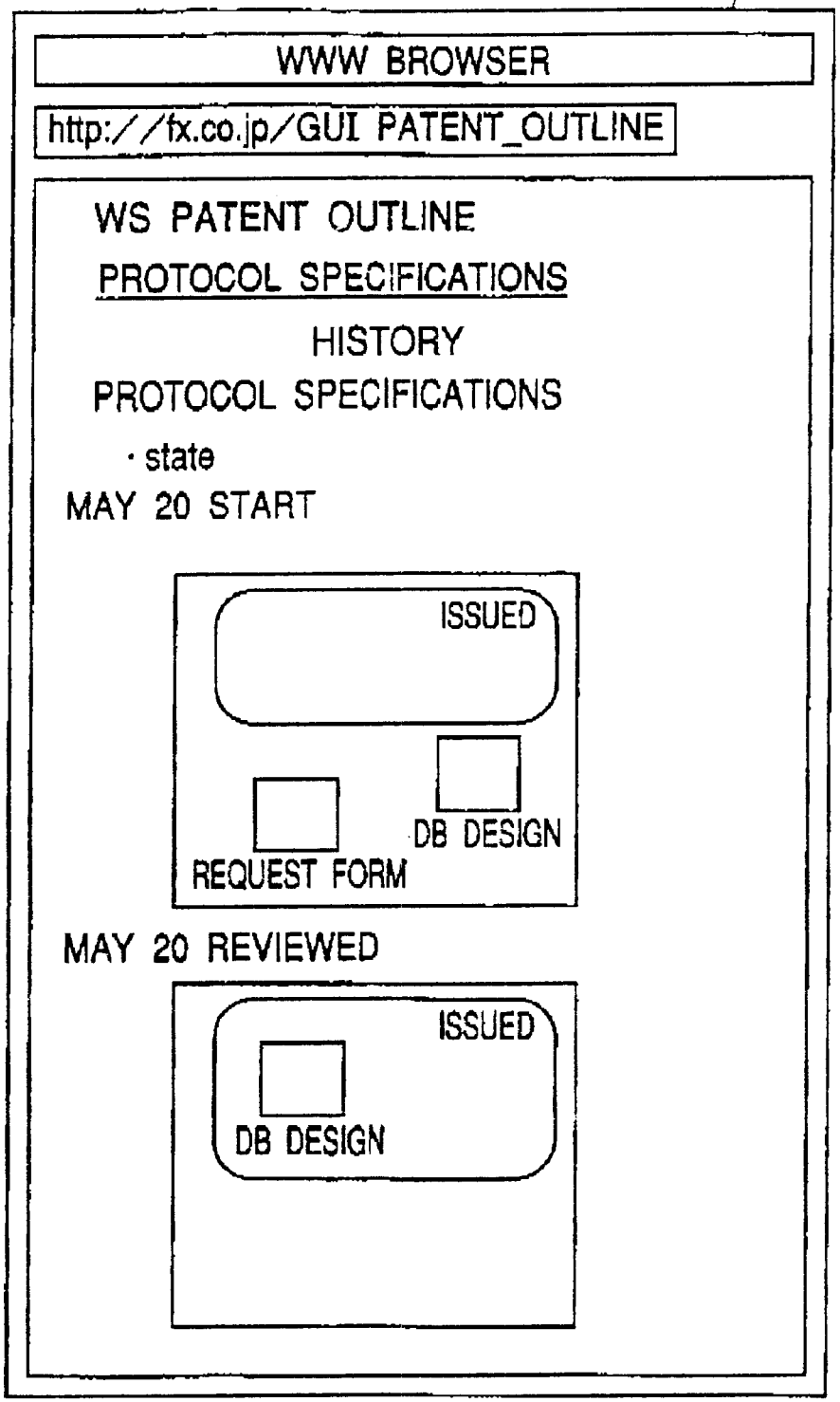
FIG. 33 illustrates the second example of screen graphically displaying an outline.

FIG. 33 illustrates the second example of screen graphically displaying an outline. On this outline displaying screen 92 a link to the state of a workspace is expressed in a contracted image of the workspace at the time instead of a string of characters.

Figure 34:
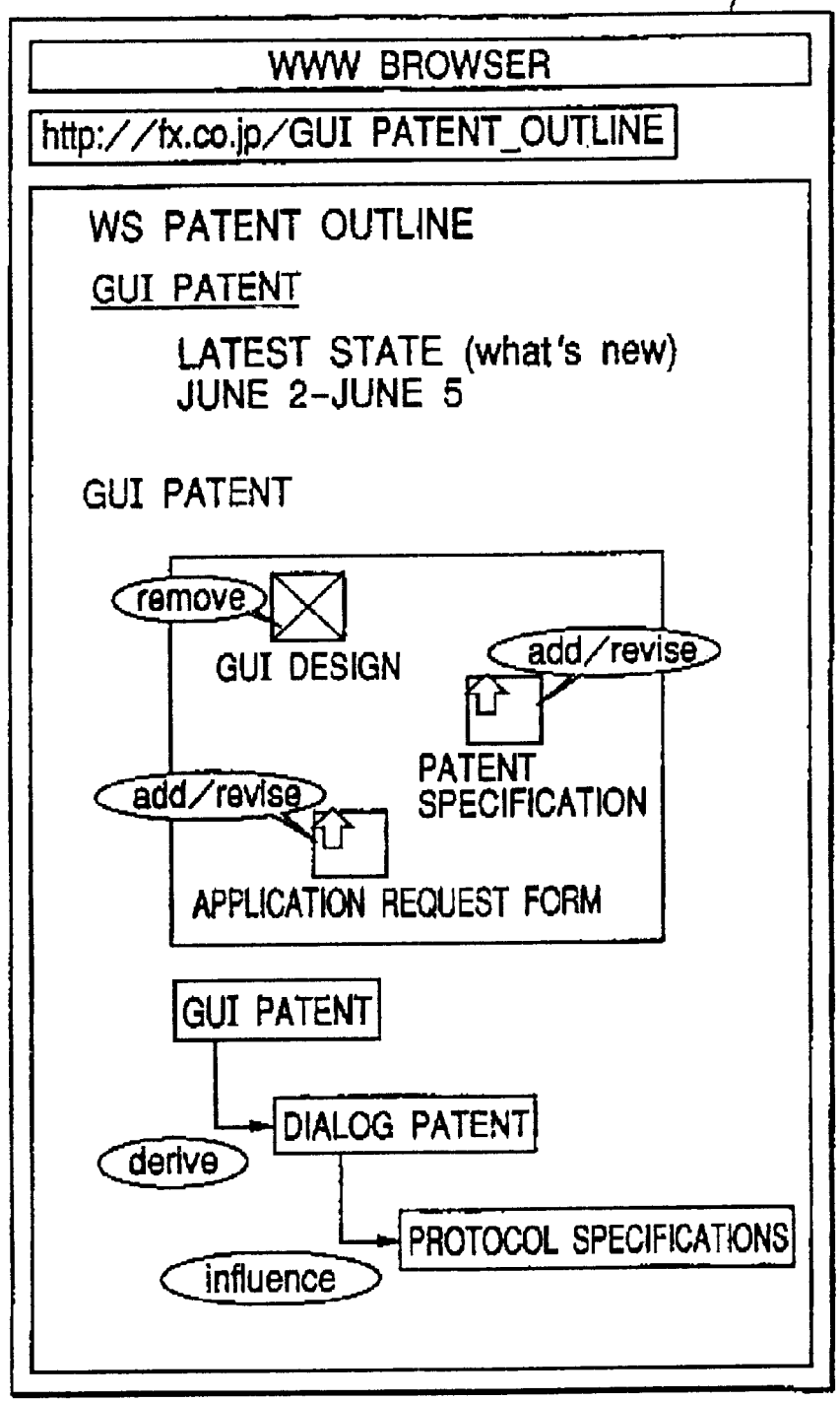
FIG. 34 illustrates the third example of screen graphically displaying an outline.

FIG. 34 illustrates the third example of screen graphically displaying an outline. On this outline displaying screen 93, changes having taken place in a given period are represented on a contracted image of the workspace. Further, the contents of processing done on a document are expressed graphically. A removed document is indicated by marking the image of that document with an X sign. An updated document is indicated by marking the image of that document with an upward arrow. Further in this example, relationships between workspaces (relationship of derivation and relationship of influencing) are graphically represented on a chart.

As hitherto described, the present invention makes it possible to automatically generate and make open documents outlining the tasks accomplished on workspaces, and keep them updated to the latest state. Therefore, the work to make known the progress of one's regular activities, which is done in addition to those regular activities, can be dispensed with and, at the same time, the progress always based on the latest information can be referenced. Moreover, there is no restraint on the range of applicability, and the present invention can be generally utilized in performing tasks.

Also, the present invention is characteristic in that documents can be generated like byproducts and that each of those documents is maintained in the manner of fixed point observation. Generation like a byproduct means that, unlike in deliberate document creation, the user's manipulation reflected in a document is primarily intended to accomplish his or her tasks on a workspace and accordingly the user need not be particularly aware of document creation. Maintaining a document in the manner of fixed point observation means that, unlike the collection of information from an unspecified range as in usual information searching, the document constantly reflecting the contents of work on a group of workspaces concerned with some specific activities is continuously maintained.

In addition to the synthesis rules described with reference to the above embodiment, various other synthesis rules can be set.

In the category of generic attributes (generic), the following synthesis rule is conceivable:

To specify the period from the date and time of the last reference to a synthesized document by a user to the present time as the designated period (generic/what's new interval). In this case, the document synthesizing unit should record the days and hours of referencing the synthesized document by the user.

In the category of hot links (hot links), the following synthesis rules are conceivable:

Documents in prescribed locations are extracted and linked to a synthesized document.

Documents of a certain size or more are extracted and linked to a synthesized document.

Documents which are displayed more frequently than a prescribed number of times by the displaying operation are extracted and linked to a synthesized document.

In the category of history (history), the following synthesis rules are conceivable.

In addition to considering whether any comment is provided or not, the states are selected if they are provided with comment information, which is the same as the designated one, regarding the progress of the work assigned by the user, and links are established to those states. Incidentally, the prescribed condition may as well be inclusion of such comments as constituent parts instead of being exactly the same as the designated comments.

The state of the workspace when more documents than a prescribed number were removed is selected, and a link is established to that state.

The state of the workspace, after having updated more than a prescribed frequency and is no longer to be updated, is selected and a link is established to that state.

The state is selected when it is updated after a prescribed period of not being updated, and a link is established to that state.

The state of the workspace when a document satisfying prescribed conditions first appeared is selected, and a link is established to that state.

Further, synthesis rules may be available for updating a synthesized document indicating an outline in any of the following timings, other than periodically updating with "generic/update intervals":

A synthesized document giving an outline is updated every time a user references it.

When prescribed manipulation is done on the workspace to be searched, the synthesized document is updated.

When printing operation is done on the workspace to be searched, the synthesized document is updated.

When another workspace has derived from the workspace to be searched, the synthesized document is updated.

When the same comments information as comments information on the progress of work has been assigned by the user on the workspace to be searched, the synthesized document is updated.

When a prescribed document is generated on the workspace to be searched, the synthesized document is updated.

When a prescribed document is removed from the workspace to be searched, the synthesized document is updated.

Or, the user may wish to alter the results of synthesis as he or she desires. In that case, the user may input an alteration command into the document synthesizing unit apart from the synthesis rules. Then the document synthesizing unit transfers the synthesized document having been altered in accordance with the alteration command to the synthesized document display unit. The contents of the alteration command may state an element desired to be removed or an element desired to be added.

In addition, the foregoing processing can be implemented by causing a computer to execute a program in which the contents of processing are described. By recording the program on a computer-readable recording medium, it is possible to cause a computer to execute it whenever required. A computer-readable recording medium may be a magnetic recording device, a semiconductor memory or the like. For marketing purposes, the program can be recorded on a portable recording medium such as a compact disk read only memory (CD-ROM) or a floppy disk, or stored in the memory unit of a computer connected via a network for transfer to another computer via a network. When it is to be executed by a computer, the program may be stored in a hard disk unit or the like within the computer, and loaded onto the main memory for execution.

As hitherto described, an outline information generating apparatus according to the present invention, as it stores information on the history of operations performed on workspaces, synthesizes the history information in accordance with synthesis rules and thereby generates outline information, can automatically generate information on the outline of operations performed on workspaces.

Also, a computer-readable recording medium recording thereon an outline information generating program according to the present invention, by causing the recorded outline information generating program to be executed by a computer, can cause the computer to carry out processing to store information on the history of operations performed on workspaces, synthesize the history information in accordance with synthesis rules and thereby generate outline information.

What is claimed is:

1. An outline information generating apparatus for generating information outlining any work that has been done on a workspace, which is an environment for manipulating electronic resources, comprising:

a workspace editing part that alters the latest state of the workspace by manipulating the electronic resources on the workspace;

a workspace history managing part that holds as history information the contents and objects of manipulation performed by the workspace editing part on the workspace;

a synthesis rule holding part that holds synthesis rules prescribing rules on the synthesis of history information; and a synthesizing part that synthesizes, in accordance with the synthesis rules held by the synthesis rule holding part, the history information managed by the workspace history managing part and generates outline information.

2. The outline information generating apparatus according to claim 1, further comprising:

a workspace selecting part that selects workspaces to be searched for history information out of history information held by the workspace managing part, wherein the synthesizing part synthesizes history information related to the workspaces selected by the workspace selecting part.

3. The outline information generating apparatus according to claim 2, wherein the synthesis rule holding part holds synthesis rules prescribing the conditions of the workspaces to be searched, and the workspace selecting part selects, as the workspaces to be searched, workspaces satisfying the conditions prescribed under the synthesis rules held by the synthesis rules holding part.

4. The outline information generating apparatus according to claim 3, wherein the synthesis rule holding part holds synthesis rules to the effect that designated workspaces designated by a user and workspaces having a prescribed relationship with the designated workspaces are the workspaces to be searched.

5. The outline information generating apparatus according to claim 1, wherein the synthesizing part updates history information, triggered by the satisfaction of a prescribed condition.

6. The outline information generating apparatus according to claim 1, wherein the synthesizing part specifies an electronic resource fitting the synthesis rules on the basis of history information managed by the workspace history managing part, and generates the outline information as a hyperdocument associated with the specified electronic resource by linking.

7. The outline information generating apparatus according to claim 6, wherein the synthesis rule holding part holds synthesis rules to the effect that, if attribute information associated with an electronic resource on a workspace satisfies prescribed conditions, the electronic resource is an object of synthesis.

8. The outline information generating apparatus according to claim 6, wherein the synthesis rule holding part holds synthesis rules to the effect that, out of selected electronic resources, only those electronic resources that existed in the past within a prescribed length of time from the latest state are objects of synthesis.

9. The outline information generating apparatus according to claim 1, wherein the synthesizing part selects, out of the current and past states of a workspace, states satisfying the synthesis rules, and generates outline information for displaying contents of the selected state.

10. The outline information generating apparatus according to claim 9, wherein the synthesis rule holding part holds synthesis rules to the effect that a state of a workspace at the time a prescribed operation was performed is selected.

11. The outline information generating apparatus according to claim 1, wherein the synthesis rule holding part selects workspaces having specific relationships with designated workspaces designated by a user and generates outline information for displaying contents of the selected workspaces.

12. The outline information generating apparatus according to claim 1, wherein the synthesizing part generates outline information including contents regarding changes in information within a prescribed period for a workspace.

13. The outline information generating apparatus according to claim 1, wherein the synthesizing part synthesizes history information in a manner permitting the underlying synthesis rule to be identified.

14. The outline information generating apparatus according to claim 1, wherein the synthesizing part generates outline information in a displaying form wherein history information is arranged in a contracted image of a workspace.

15. A computer-readable recording medium recording thereon an outline information generating program for generating information outlining any activity that has been done on a workspace, which is an environment for manipulating electronic resources, causing a computer to function as:

a workspace editing part that alters the latest state of a workspace by manipulating the electronic resources on the workspace;

a workspace history managing part that holds as history information the contents and objects of manipulation performed by the workspace editing part on the workspace;

a synthesis rule holding part that holds synthesis rules prescribing rules on the synthesis of history information; and a synthesizing part that synthesizes, in accordance with the synthesis rules held by the synthesis rule holding part, the history information managed by the workspace history managing part and generates outline information.

* * * * *